(12) United States Patent
Kano et al.

(10) Patent No.: US 9,806,634 B2
(45) Date of Patent: Oct. 31, 2017

(54) INVERTER CONTROLLER, POWER CONVERTER, AND CAR

(71) Applicant: KABUSHIKI KAISHA TOSHIBA, Minato-ku (JP)

(72) Inventors: Masaru Kano, Mie (JP); Shoichiro Tanaka, Kuwana (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 381 days.

(21) Appl. No.: 14/628,656

(22) Filed: Feb. 23, 2015

(65) Prior Publication Data

US 2015/0256105 A1    Sep. 10, 2015

(30) Foreign Application Priority Data

Mar. 5, 2014 (JP) ................................ 2014-043301

(51) Int. Cl.
    *H02M 3/335* (2006.01)
    *H02M 7/537* (2006.01)
    (Continued)

(52) U.S. Cl.
    CPC ............. *H02M 7/537* (2013.01); *B60L 3/003* (2013.01); *B60L 7/14* (2013.01); *B60L 11/1803* (2013.01);
    (Continued)

(58) Field of Classification Search
    CPC .................................................... H02M 3/335
    See application file for complete search history.

(56) References Cited

U.S. PATENT DOCUMENTS

2006/0250728 A1   11/2006   Hussein
2009/0160248 A1    6/2009   Ang
(Continued)

FOREIGN PATENT DOCUMENTS

CN       1799189 A    7/2006
CN    101361253 A    2/2009
(Continued)

OTHER PUBLICATIONS

Extended European Search Report issued on Jul. 17, 2015 in Patent Application No. 15156230.3.
(Continued)

*Primary Examiner* — Daniel Puentes
(74) *Attorney, Agent, or Firm* — Oblon, McClelland, Maier & Neustadt, L.L.P.

(57) ABSTRACT

According to one embodiment, an inverter controller includes a current controller which calculates and output PWM modulation ratio instructions of a first phase and a second phase, such that an inverter outputs a predetermined current; a switching timing arithmetic unit which calculates timings at which switches of the respective phases are opened and closed; a simultaneous switching avoiding unit which determines whether a first switching timing for changing over the switch of the first phase and a second switching timing for changing over the switch of the second phase coincide or not, and to generate, upon determining that the first switching timing and the second switching timing coincide, triangular-wave carriers of the first phase and the second phase by making different waveforms of the triangular-wave carriers; and a switch opening/closing timing generator which calculates a timing for opening/closing the switch.

10 Claims, 20 Drawing Sheets

(51) Int. Cl.
  *H02M 1/44* (2007.01)
  *H02M 7/5395* (2006.01)
  *B60L 11/18* (2006.01)
  *B60L 3/00* (2006.01)
  *B60L 7/14* (2006.01)
  *B60L 15/00* (2006.01)
  *B60L 15/20* (2006.01)

(52) U.S. Cl.
  CPC ......... *B60L 15/007* (2013.01); *B60L 15/2009* (2013.01); *H02M 1/44* (2013.01); *H02M 7/5395* (2013.01); *B60L 2210/14* (2013.01); *B60L 2240/12* (2013.01); *B60L 2240/36* (2013.01); *B60L 2240/421* (2013.01); *B60L 2240/423* (2013.01); *B60L 2240/427* (2013.01); *B60L 2240/429* (2013.01); *Y02T 10/645* (2013.01); *Y02T 10/7005* (2013.01); *Y02T 10/7225* (2013.01); *Y02T 10/7275* (2013.01)

(56) References Cited

U.S. PATENT DOCUMENTS

| | | | |
|---|---|---|---|
| 2010/0072928 | A1 | 3/2010 | Welchko |
| 2013/0063059 | A1* | 3/2013 | Chi ............... H02P 27/08 318/400.13 |
| 2014/0001990 | A1 | 1/2014 | Takamatsu et al. |

FOREIGN PATENT DOCUMENTS

| | | |
|---|---|---|
| CN | 102771044 A | 11/2012 |
| JP | 2005-51959 A | 2/2005 |
| JP | 2007-202387 A | 8/2007 |
| JP | 2008-125178 A | 5/2008 |
| JP | 2011 160570 | 8/2011 |
| JP | 2011-160571 A | 8/2011 |

OTHER PUBLICATIONS

Combined Office Action and Search Report dated Jan. 4, 2017 in Chinese Patent Application No. 201510085295.1 (with English translation of categories of cited documents).

* cited by examiner

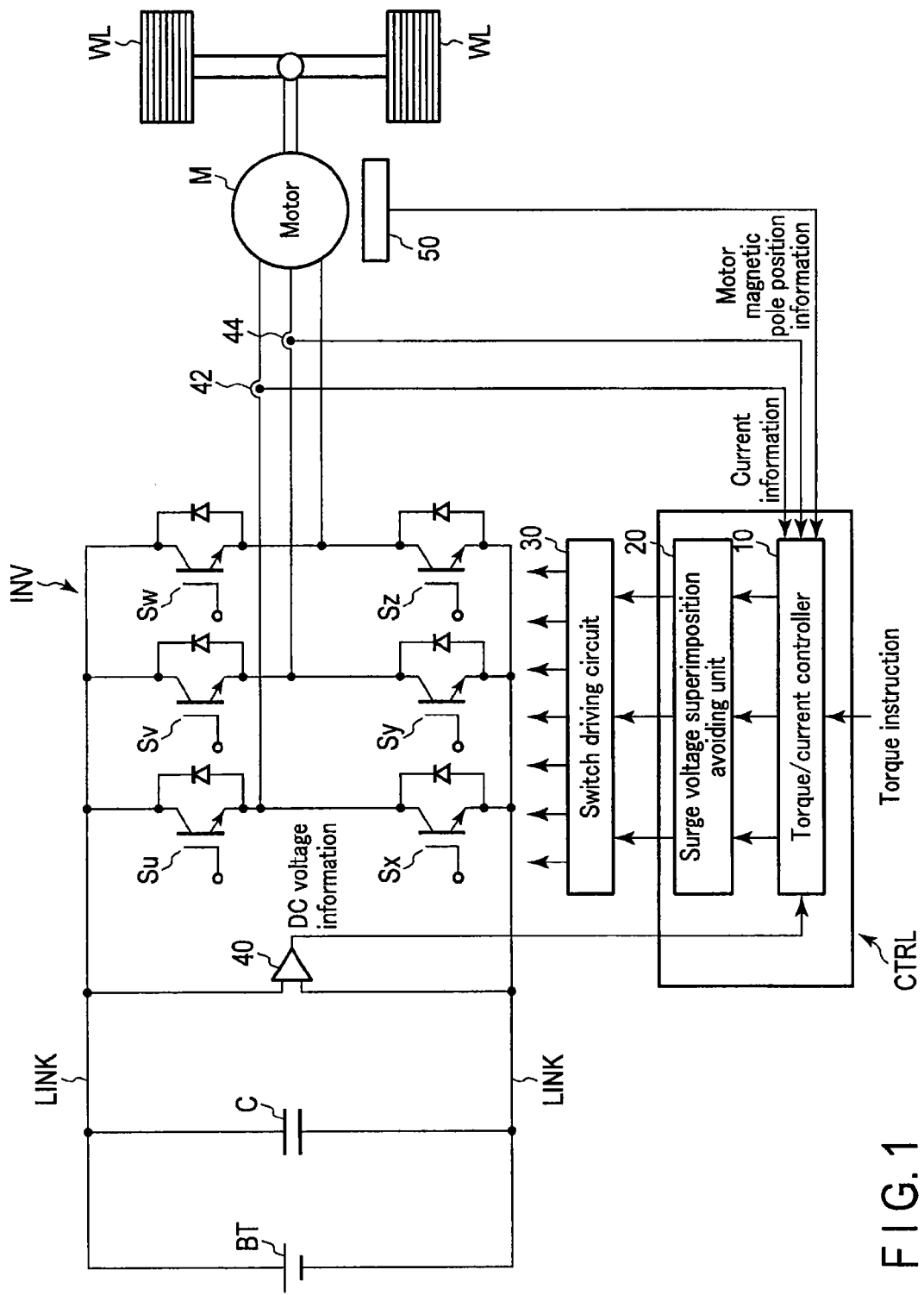
F I G. 1

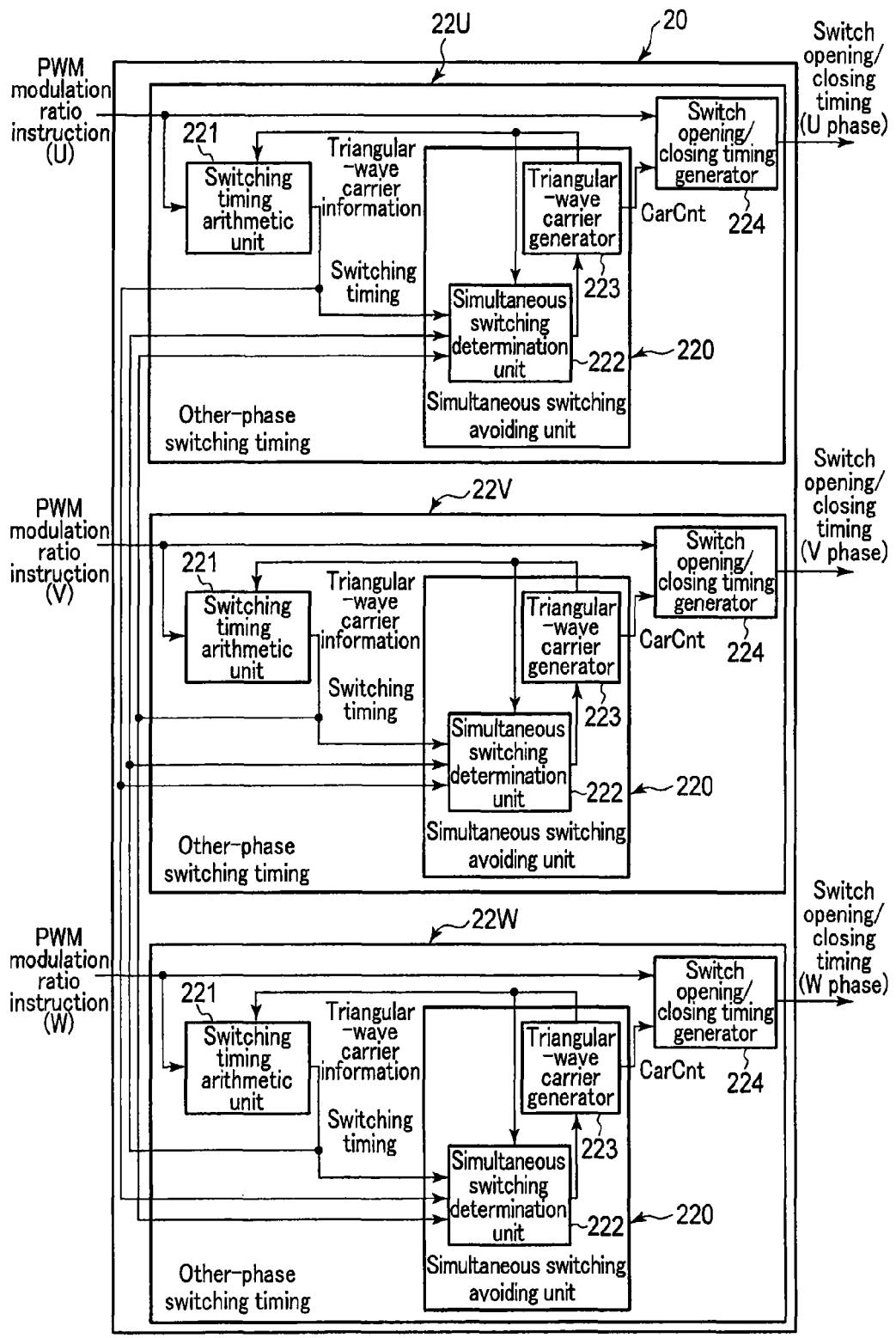
F I G. 3

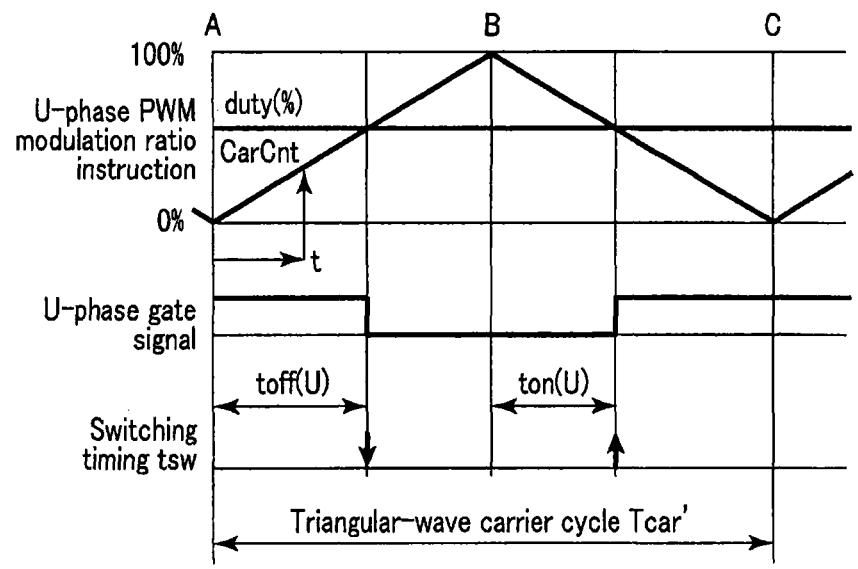
F I G. 4A

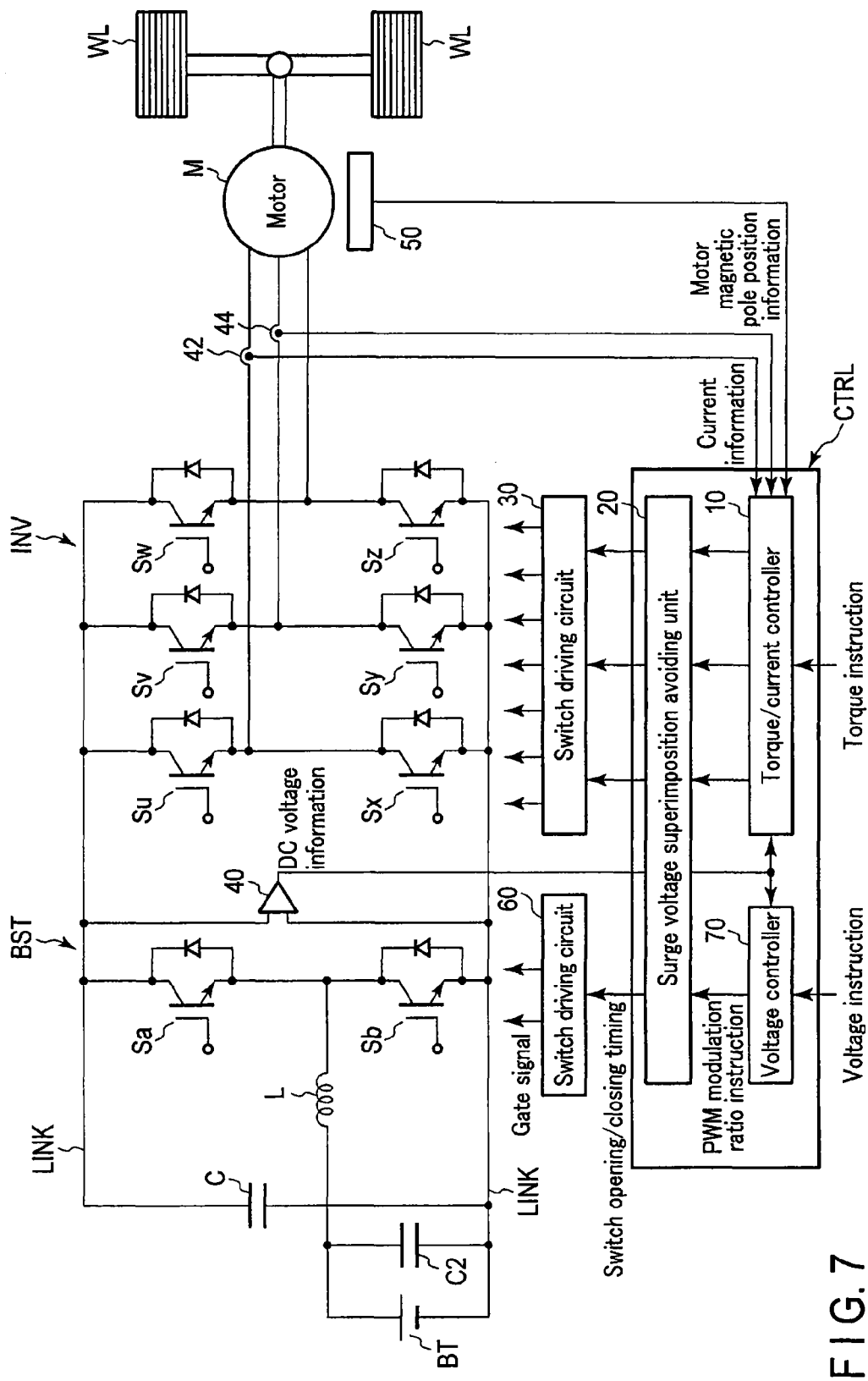
F I G. 7

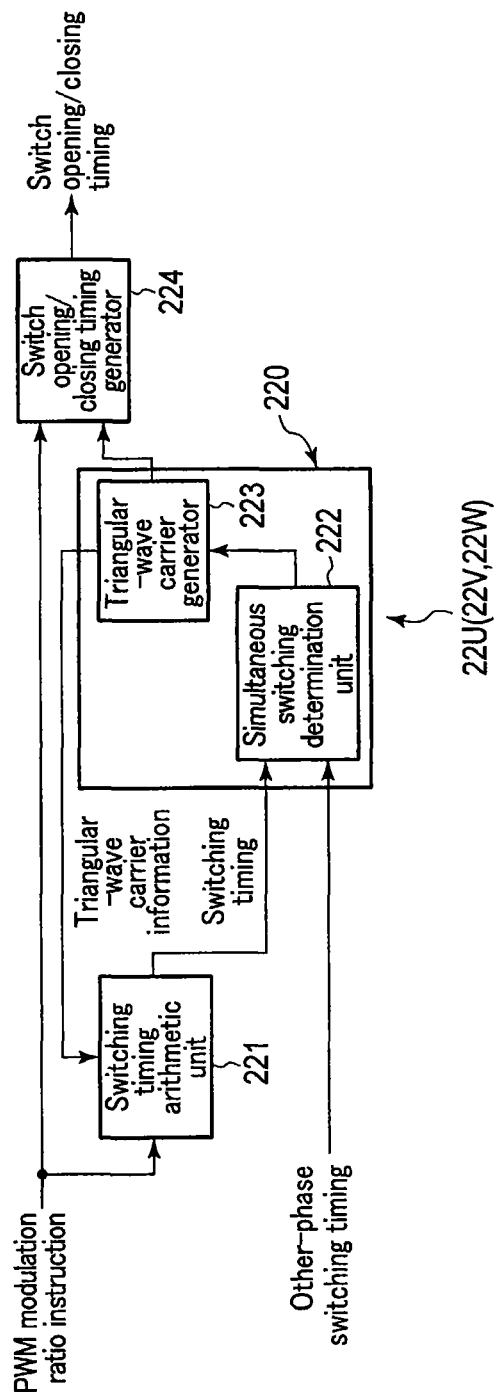
F I G. 9

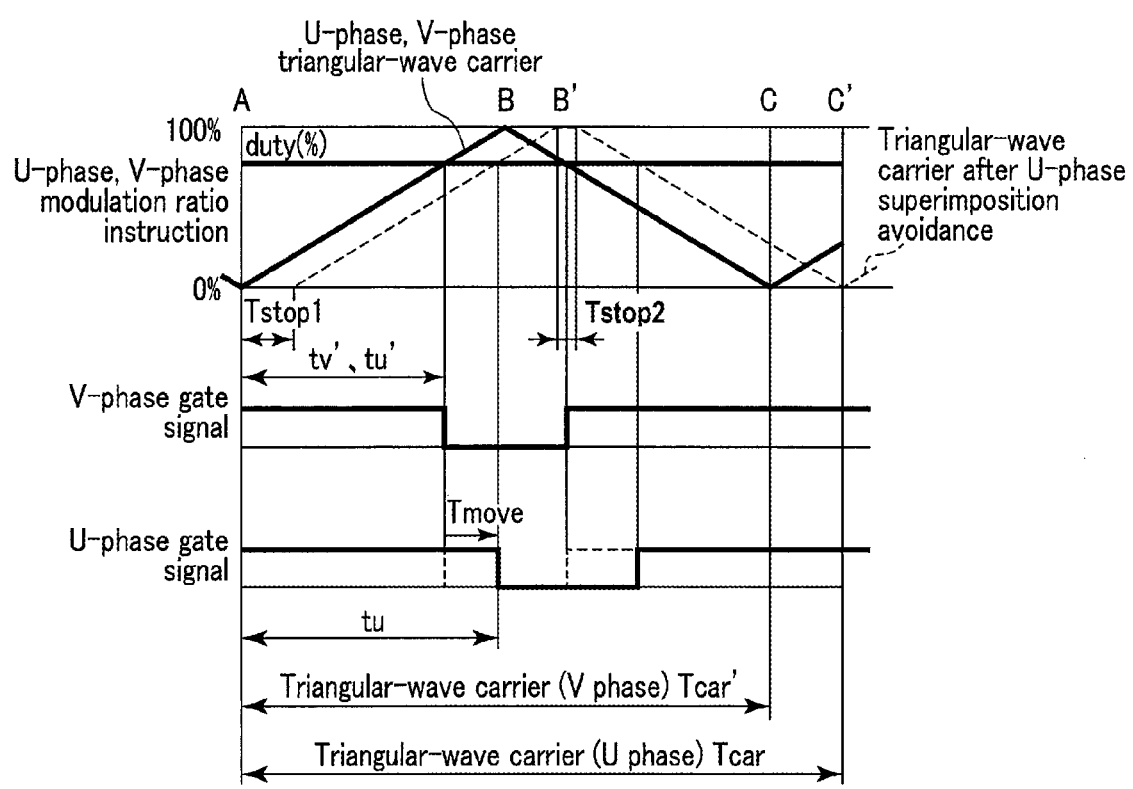
F I G. 10

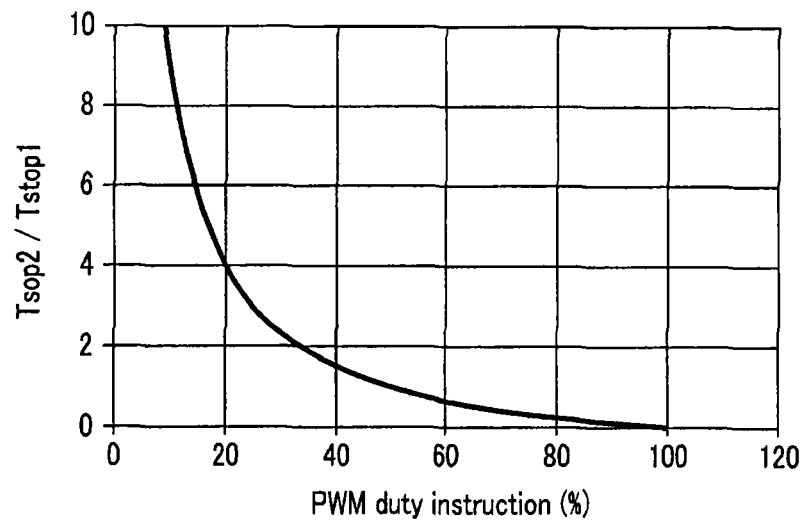
F I G. 11
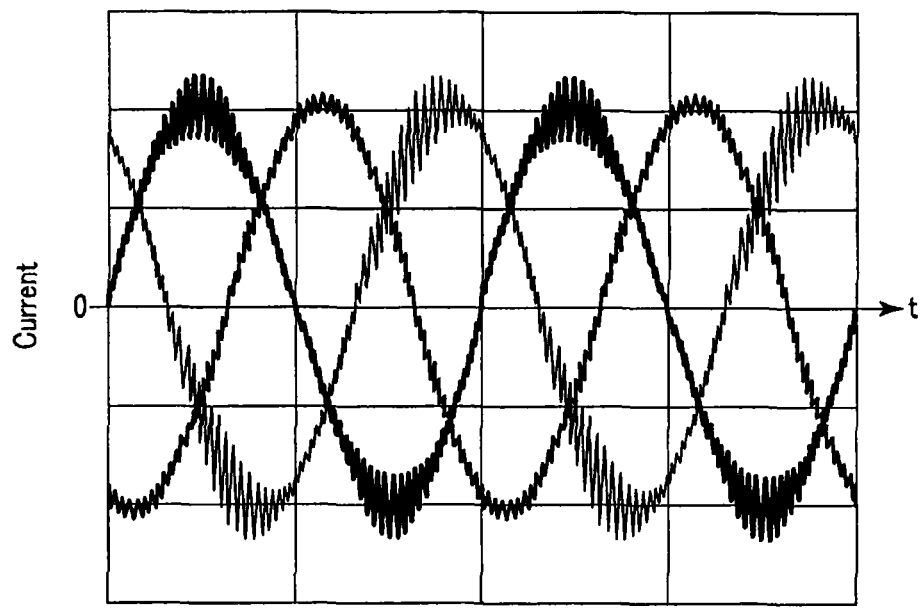
F I G. 12

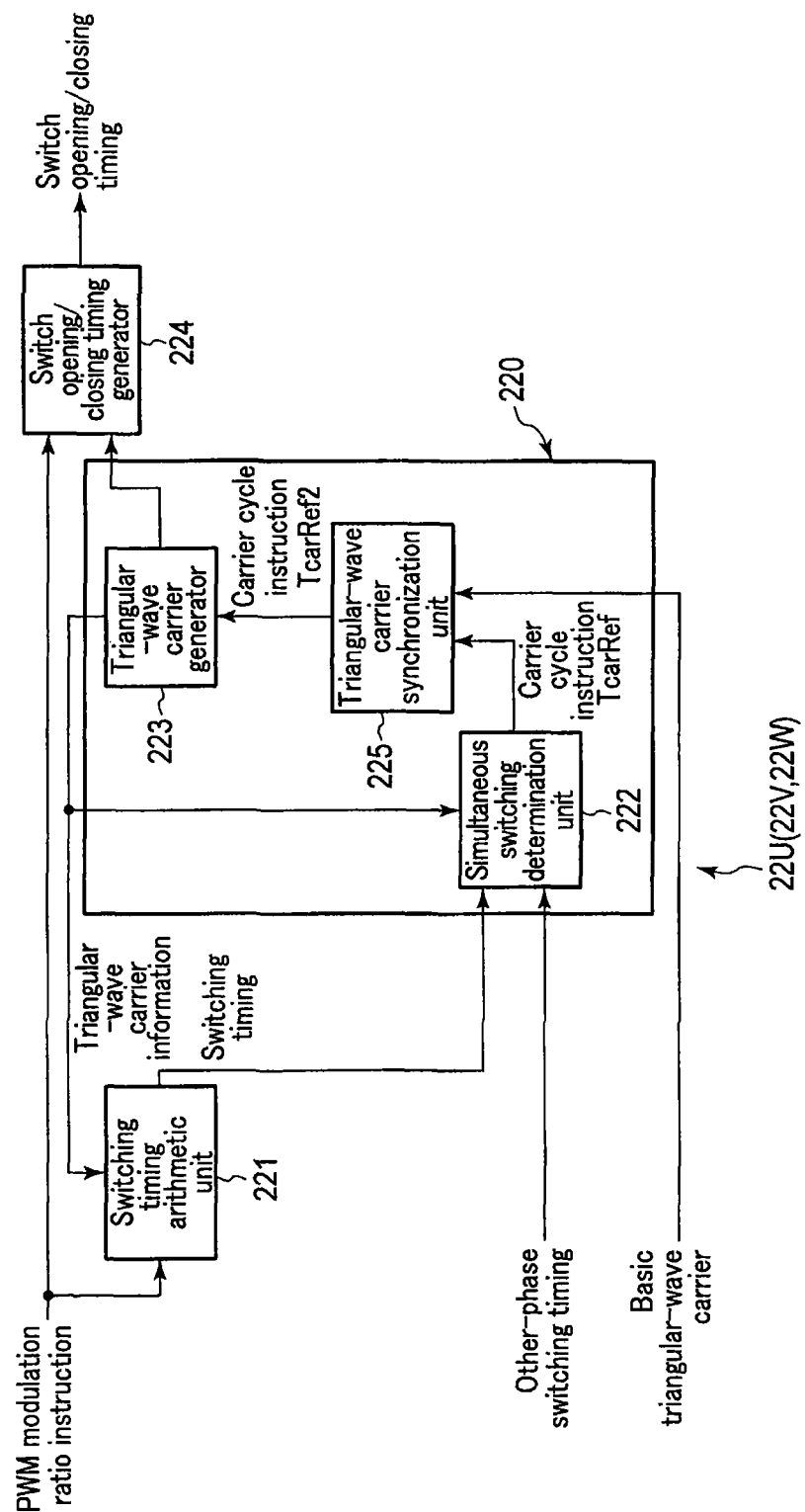
F I G. 13

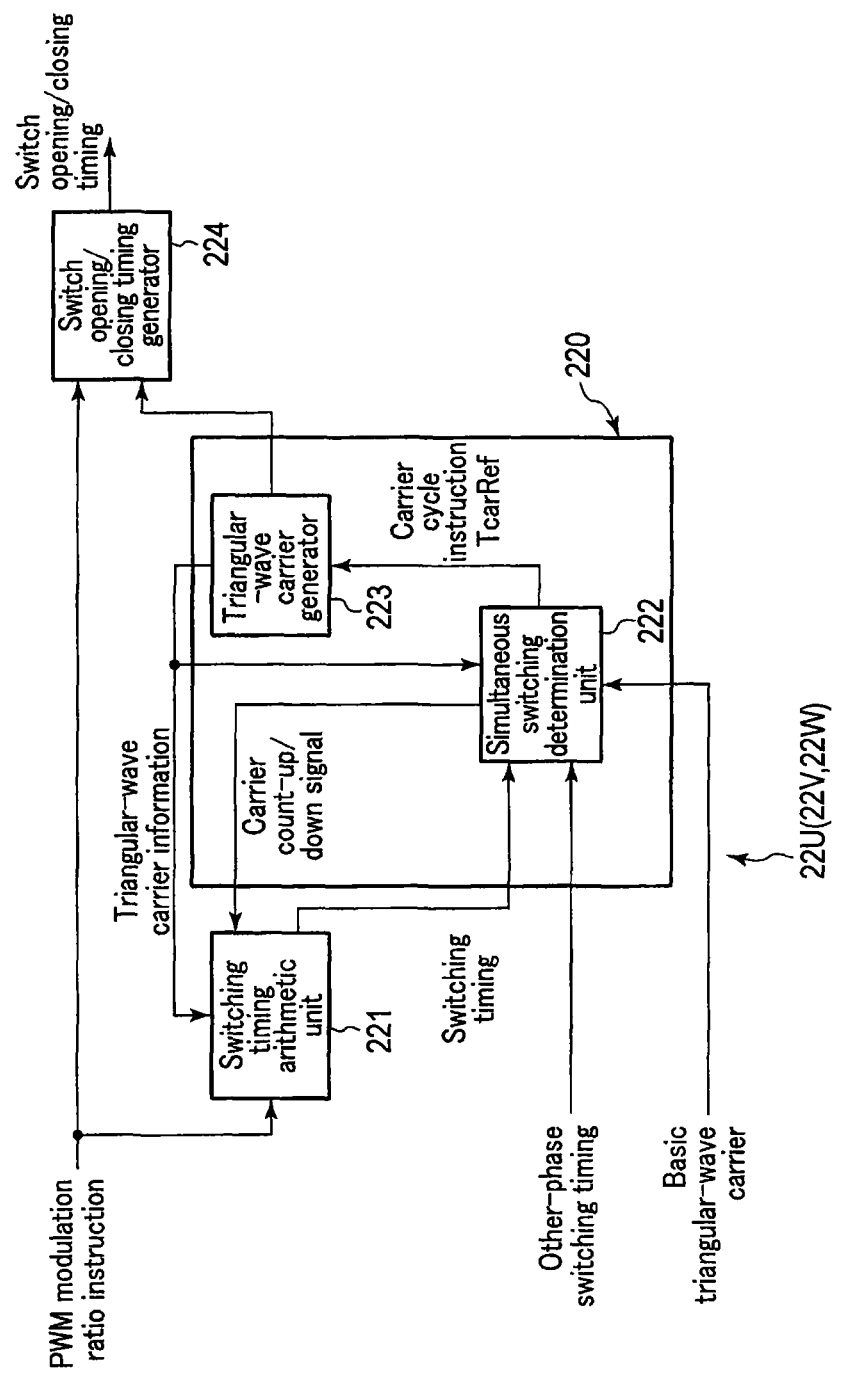
F I G. 15

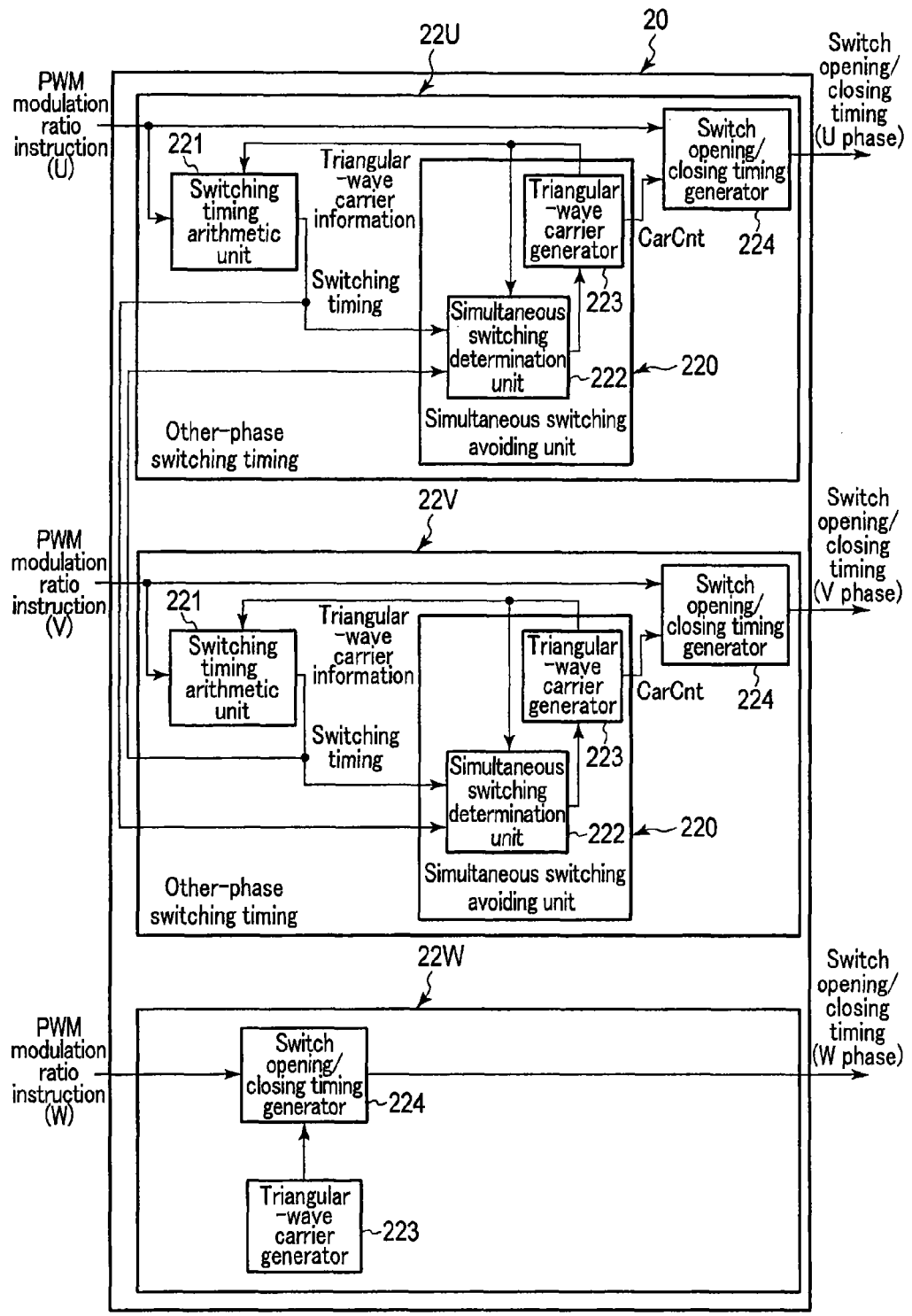
F I G. 18

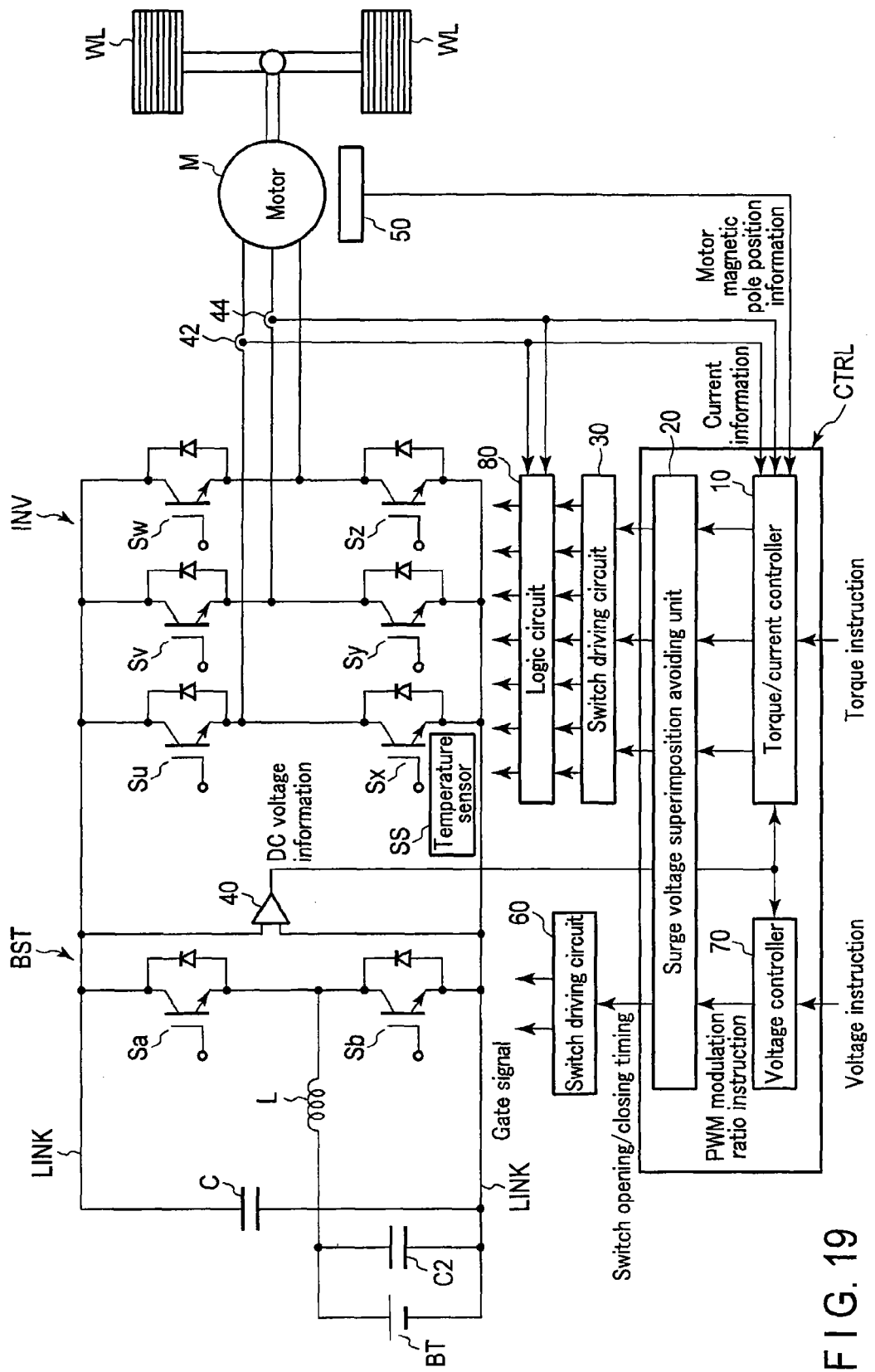
F I G. 19

INVERTER CONTROLLER, POWER CONVERTER, AND CAR

CROSS-REFERENCE TO RELATED APPLICATIONS

This application is based upon and claims the benefit of priority from Japanese Patent Application No. 2014-043301, filed Mar. 5, 2014; the entire contents of which are incorporated herein by reference.

FIELD

Embodiments described herein relate generally to an inverter controller, a power converter, and a car.

BACKGROUND

A power converter, for example, converts DC power to AC power by changing over a plurality of switches of an inverter, and supplies the AC power to a load. When two or more switches of the inverter are changed over at the same time, there is a case in which a large voltage (surge voltage) is temporarily applied to the switches, and the switches are broken. In order to avoid such breakage of switches, for example, there has been proposed a power converter which uses switches with a high breakdown voltage, reduces a surge voltage by connecting a capacitor in parallel with switches, or delays the operation speed of switches.

BRIEF DESCRIPTION OF THE DRAWINGS

FIG. 1 is a view for describing an example of an inverter controller, a power converter and a car according to an embodiment.

FIG. 3 is a block diagram illustrating a configuration example of a surge voltage superimposition avoiding unit of the inverter controller, power converter and car illustrated in FIG. 1.

FIG. 4A is a timing chart for describing an operation example of the surge voltage superimposition avoiding unit illustrated in FIG. 3.

FIG. 7 is a view for describing another example of the inverter controller, power converter and car of the embodiment.

FIG. 9 is a block diagram illustrating a configuration example of a switch opening/closing signal generation circuit in an inverter controller, a power converter and a car according to a second embodiment.

FIG. 10 is a timing chart for describing an operation example of a surge voltage superimposition avoiding unit illustrated in FIG. 9.

FIG. 11 is a graph illustrating an example of a ratio between a stop time Tstop2 and a stop time Tstop1 in relation to a PWM modulation ratio instruction at a time when equation 15 is applied.

FIG. 12 illustrates an example of a three-phase current at a time when triangular-wave carriers of the U phase and W phase of a three-phase inverter are set at 5000 Hz, and a triangular-wave carrier of the V phase is set at 4800 Hz.

FIG. 13 is a block diagram illustrating a configuration example of a switch opening/closing signal generation circuit in an inverter controller, a power converter and a car according to a third embodiment.

FIG. 15 is a block diagram illustrating a configuration example of a switch opening/closing signal generation circuit in an inverter controller, a power converter and a car according to a fourth embodiment.

FIG. 18 is a block diagram illustrating a configuration example of a surge voltage superimposition avoiding unit of the inverter controller, power converter and car illustrated in FIG. 17.

FIG. 19 is a view for describing an example of an inverter controller, a power converter and a car according to a sixth embodiment.

DETAILED DESCRIPTION

Figure 2:
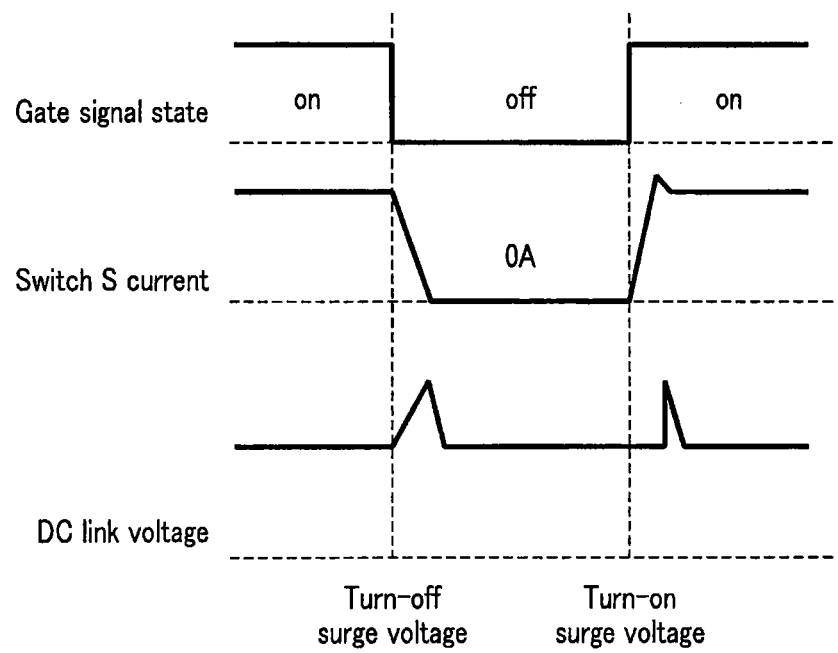
FIG. 2 is a view for explaining an example of a surge voltage.

An inverter controller, a power converter and a car according to an embodiment will be described hereinafter with reference to the accompanying drawings.

FIG. 1 is a view for describing an example of an inverter controller, a power converter and a car according to an embodiment.

The car of the embodiment includes a power converter, a motor M, wheels WL, and an axle for transmitting a torque of the motor M to the wheels WL. The power converter includes an inverter and an inverter controller. The power converter includes a DC power supply BT, an inverter INV, a smoothing capacitor C, a DC voltage detector 40, current detectors 42, 44, a motor M, a motor magnetic pole position detector 50, and an inverter controller CTRL. The inverter INV is a three-phase inverter, and includes a plurality of switches Su, Sx, Sv, Sy, Sw, and Sz, and a switching driving circuit 30.

The DC power supply BT is, for instance, a battery such as a lithium ion battery or a nickel hydride battery. DC power, which is output from the DC power supply BT, is supplied to the inverter INV, and the DC power supply BT is charged with electric energy which is generated by a load, for instance, the motor M, which is connected via the inverter INV.

The inverter INV is a three-phase inverter which converts the DC power, which is supplied from the DC power supply BT, to three-phase AC power. The inverter INV includes a plurality of switches Su, Sx, Sv, Sy, Sw and Sz. The inverter INV opens and closes the plural switches Su, Sx, Sv, Sy, Sw and Sz by gate signals SW1 to SW6 from the switch driving circuit 30, thereby supplying a three-phase AC current to the motor M.

Each of the plural switches Su, Sx, Sv, Sy, Sw and Sz is, for example, a semiconductor switch, such as an FET (Field-Effect Transistor) or an IGBT (Insulated Gate Bipolar Transistor). The switches Su and Sx of a U phase, the switches Sv and Sy of a V phase and the switches Sw and Sy of a W phase are connected in parallel. In each phase, the paired switches are connected in series, and a series connection node of the paired switches is connected to the motor M. For example, in the U phase, the paired switches Su and Sx are connected in series, and a series connection node of the paired switches Su and Sx is connected to the motor M.

The motor M generates a torque by the current supplied from the inverter INV. An axle is connected to an output shaft of the motor M, and the generated torque is transmitted to the wheels WL via the axle. In addition, the motor M is regeneratively driven by converting the kinetic energy of the wheels WL, which is transmitted via the axle, to electric power. The power by the regenerative driving of the motor M is converted to DC power by the inverter INV, and the DC power supply BT is charged with the DC power.

The DC voltage detector 40 detects a voltage of a DC link unit (DC current supply line) LINK to which the inverter INV is connected, and outputs a detection result to the inverter controller CTRL. The DC link unit LINK supplies a DC current mutually between the DC power supply BT and the inverter INV.

The current detector 42, 44 detects a current which is supplied to the motor M, and outputs a detection result to the controller CTRL. The current detector 42 detects a U-phase current which is supplied to the motor M, and the current detector 44 detects a V-phase current which is supplied to the motor M.

The motor magnetic pole position detector 50 is, for example, a resolver, and detects an angular position of the rotor of the motor M and outputs a detection result to the inverter controller CTRL.

The inverter controller CTRL includes, for example, a processor such as a CPU. The inverter controller CTRL includes a current controller 10 which calculates and outputs PWM modulation instructions of the respective phases so that the inverter may output a predetermined current, based on an instruction supplied from the outside, and also includes a surge voltage superimposition avoiding unit 20.

The torque/current controller (current controller) 10 receives DC voltage information which is detected by the DC voltage detector 40, current information which is detected by the current detector 42, motor magnetic pole position information which is detected by the motor magnetic pole position detector 50, and a torque instruction from, for example, an external apparatus, and outputs three-phase PWM modulation ratio instructions so that the motor M may output the torque. In a general method, in the torque/current controller 10, current instruction values for realizing a desired torque are stored in advance, and the torque/current controller 10 calculates three-phase voltage instructions from differences between these current instruction values and the current information by using PI (proportion/integration) control. By using the calculated three-phase voltage instructions and DC voltage values, the torque/current controller 10 calculates three-phase PWM modulation ratio instructions. The three-phase PWM modulation ratio instruction calculated in this case is a duty ratio [%].

The smoothing capacitor C is connected in parallel with the plural switches Su, Sx, Sv, Sy, Sw and Sz and the DC power supply BT, between the DC power supply BT and the inverter INV. The smoothing capacitor C suppresses a variation in voltage of the DC link unit LINK to which the inverter INV is connected, the variation occurring due to the operation of the inverter INV.

FIG. 2 is a view for explaining an example of a surge voltage.

For example, if the switch Su transitions from an ON state to an OFF state, the current flowing in the switch Su changes to 0 A, and a turn-off surge voltage is applied to the DC link unit LINK. In addition, if the switch Su transitions from the OFF state to the ON state, the current flowing in the switch Su increases from 0 A, and a turn-on surge voltage is applied to the DC link unit LINK. The smoothing capacitor C absorbs a surge voltage occurring when the switch Su, Sx, Sv, Sy, Sw, Sz is opened/closed, as described above, thereby suppressing breakage of the switch Su, Sx, Sv, Sy, Sw, Sz by the application of a high voltage.

As described above, if the smoothing capacitor C is connected in parallel with the switch Su, Sx, Sv, Sy, Sw, Sz, the surge voltage which is applied to the DC link unit LINK can be suppressed. However, if a plurality of switches operate at the same time, surge voltages are superimposed. In this case, the application of a high voltage to the switch Su, Sx, Sv, Sy, Sw, Sz can be avoided by increasing the capacitance of the smoothing capacitor C or by increasing the number of capacitors which are connected. However, the cost and size of components increase, and the configuration of the power converter becomes complex. In addition, although a surge voltage can be suppressed by delaying the speed of switching of the plural switches Su, Sx, Sv, Sy, Sw and Sz, the loss in the switches increases.

Taking the above into account, in the present embodiment, the timing of switching of the plural switches Su, Sx, Sv, Sy, Sw and Sz is adjusted so that no superimposition of surge voltages will occur.

The surge voltage superimposition avoiding unit 20 adjusts the switch opening/closing timing, based on the PWM modulation ratio instructions which are output from the torque/current controller 10, so as to avoid simultaneous switching of the switches of the U phase, V phase and W phase. The operation of the surge voltage superimposition avoiding unit 20 will be described later in detail.

The switch driving circuit 30 receives switching opening/closing timings from the surge voltage superimposition avoiding unit 20, and outputs gate signals to the inverter INV so that the switches of the inverter INV may be opened/closed at these timings. In the case where two switches are connected in series in each of the phases of the inverter INV, the switch driving circuit 30 outputs two gate signals for each phase. Incidentally, when two gate signals are generated for each phase, a switch opening/closing timing, which is output from a switching opening/closing timing generator (to be described later), may be used for a gate signal of one of the switches, and a signal, which is obtained by inverting this gate signal, may be used as an opening/closing signal of the other switch. In addition, in order to prevent an open short-circuit of two switches, it is desirable to provide a dead time period in which both of the two switches are turned off. Besides, in order to reduce the switching loss of each switch, the ON state or OFF state of either of the two switches may be maintained.

FIG. 3 is a block diagram illustrating a configuration example of the surge voltage superimposition avoiding unit of the inverter controller, power converter and car illustrated in FIG. 1.

Figure 4B:
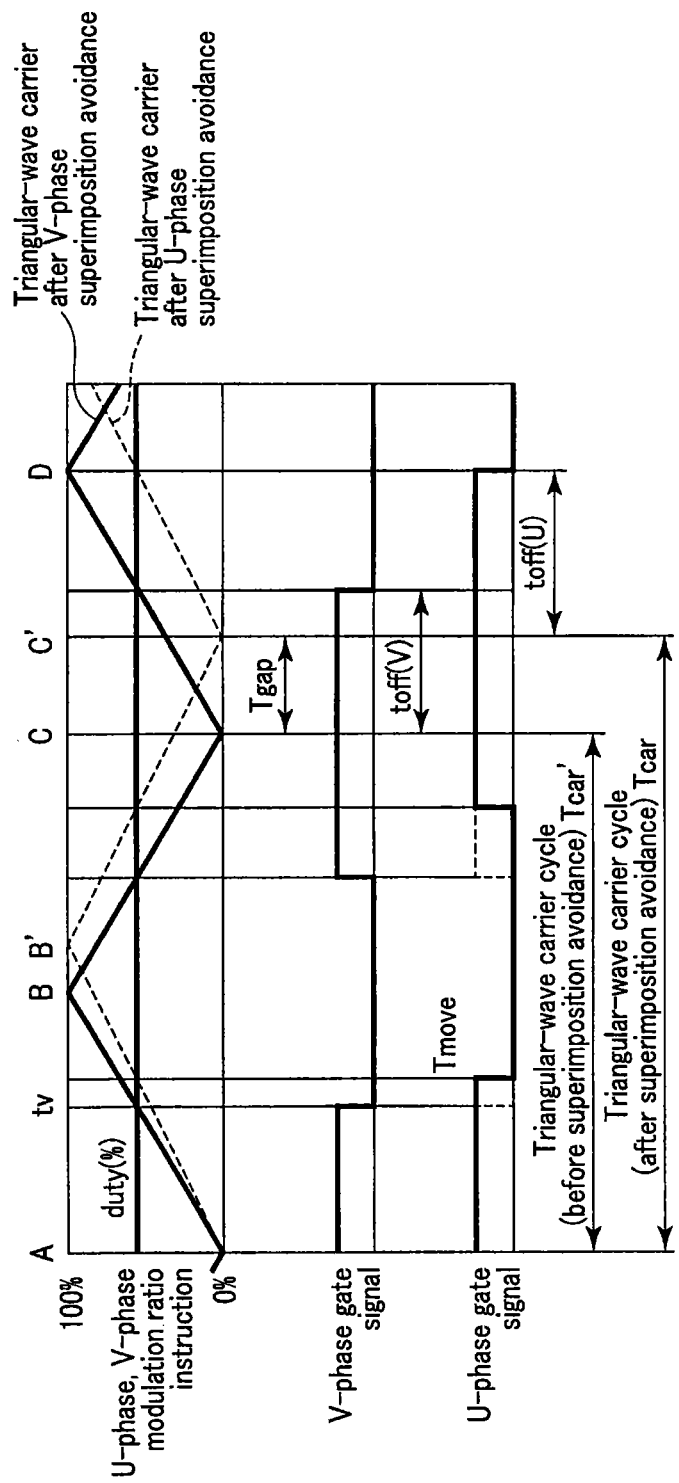
FIG. 4B is a timing chart for describing another operation example of the surge voltage superimposition avoiding unit illustrated in FIG. 3.
Figure 5:
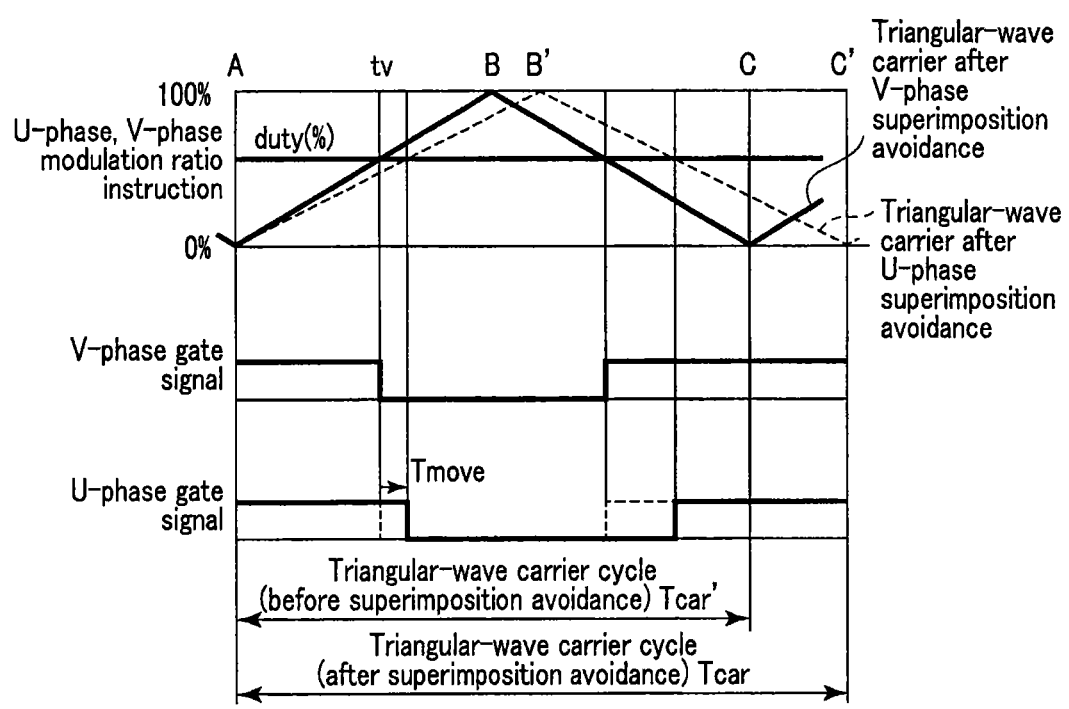
FIG. 5 is a timing chart for describing an operation example of the surge voltage superimposition avoiding unit illustrated in FIG. 3.

FIG. 4A and FIG. 5 are timing charts for describing operation examples of the surge voltage superimposition avoiding unit illustrated in FIG. 3.

The surge voltage superimposition avoiding unit 20 includes switch opening/closing signal generation circuits 22U, 22V and 22W of the respective phases. Incidentally, the switch opening/closing signal generation circuits 22U, 22V and 22W have the same configuration, and execute the same operation in the respective phases. Thus, in the description below, the configuration and operation of the switch opening/closing signal generation circuit 22U of the U phase are described, and a description of the switch opening/closing signal generation circuits 22V and 22W of the V phase and W phase is omitted.

The switch opening/closing signal generation circuit 22U includes a switching timing arithmetic unit 221, a simultaneous switching avoiding unit 220, and a switch opening/closing timing generator 224. The simultaneous switching avoiding unit 220 includes a simultaneous switching determination unit 222 and a triangular-wave carrier generator 223.

The switching timing arithmetic unit 221 receives a PWM modulation ratio instruction and previous triangular-wave carrier information which was output from the triangular-wave carrier generator 223 (to be described later), and calculates a switching timing. The switching timing arithmetic unit 221 outputs the calculated switching timing to the simultaneous switching determination unit 222 and to the switch opening/closing signal generation circuits 22V and 22W of the other phases.

An example of the calculation of a switching timing tsw is described below. As illustrated in the timing chart of FIG. 4A, in relation to a duty ratio (=duty) of the PWM modulation ratio instruction of the U phase, a timing tsw (a timing after the passage of a period toff from a time A) at which the gate signal is turned off can be calculated by using a period toff with reference to a time A at which count-down of a triangular-wave carrier is switched to count-up. The period toff can be calculated by equation 1.

$$toff = \frac{Tcar'}{2} \times \frac{duty}{100} \quad \text{(equation 1)}$$

Similarly, as illustrated in the timing chart of FIG. 4A, in relation to the duty ratio (=duty) of the PWM modulation ratio instruction of the U phase, a timing tsw (a timing after the passage of a period ton from a time B) at which the gate signal is turned on can be calculated by using a period ton with reference to a time B at which count-up of the triangular-wave carrier is switched to count-down. The period ton can be calculated by equation 2.

$$ton = \frac{Tcar'}{2} \times \frac{(100 - duty)}{100} \quad \text{(equation 2)}$$

The simultaneous switching avoiding unit 220 determines whether a first switching timing for changing over the switch of a first phase and a second switching timing for changing over the switch of a second phase coincide or not. If the simultaneous switching avoiding unit 220 determines that the first switching timing and the second switching timing coincide, the simultaneous switching avoiding unit 220 generates triangular-wave carriers of the first phase and the second phase by making the waveforms of the triangular-wave carriers different.

The simultaneous switching determination unit 222 receives the switching timings from the switching timing arithmetic units 221 of the switch opening/closing signal generation circuits 22U, 22V and 22W. The simultaneous switching determination unit 222 compares the switching timing tsw of the U phase and the switching timing tsw of the other phase. If an absolute value of the difference between the switching timings tsw is less than a predetermined time, the simultaneous switching determination unit 222 determines that the switching timings coincide. At this time, for example, in the case where it is understood that superimposition of surge voltages will occur when the time difference between the switching timings tsw of two phase is less than a time Tmove, the simultaneous switching determination unit 222 may determine whether the difference between the switching timing tsw of the U phase and the switching timing of the other phase is less than the time Tmove or not.

Incidentally, when the triangular-wave carrier generator 223 (to be described later) in the other phase has varied the cycle of the triangular-wave carrier, it is desirable that the switching timing arithmetic units 221 recalculates the other-phase switching timing tsw by using triangular-wave carrier information after the variation.

FIG. 4B is a timing chart for describing another operation example of the surge voltage superimposition avoiding unit illustrated in FIG. 3.

When a triangular-wave carrier already deviates, correction is necessary for the switching timings which are compared in the above-described calculation. A description is now given of the case of comparing the switching timings of the U phase and V phase after increasing the cycle of the U-phase triangular-wave carrier in order to avoid superimposition of switching timings in an A-B period.

As regards the V-phase switching timing in a C-D period, toff(V) is calculated by equation 1. As regards the U-phase switching timing in the C-D period, toff(U) is calculated by equation 1. In order to execute simultaneous switching determination of the U-phase switching, correction is made for a reference deviation time Tgap between the triangular-wave carriers of the U phase and V phase. Specifically, the simultaneous switching determination unit 222 determines that a surge is superimposed, if the absolute value of the difference between toff(U) and (toff(V)−Tgap) is less than Tmove.

When the simultaneous switching determination unit 222 determines that the switching timing coincides with that of the other phase, the simultaneous switching determination unit 222 outputs a triangular-wave carrier instruction so that the waveform of the U-phase triangular-wave carrier may vary. FIG. 5 illustrates an example at a time when the carrier cycle of the U phase was varied in such a direction as to increase the carrier cycle of the U phase, when the switching timing of the U phase and the switching timing of the V phase have coincided.

The U-phase gate signal is adjusted so as to shift the switching timing by a degree corresponding to, for example, time Tmove, in order to avoid surge voltage superimposition due to simultaneous switching with the V phase. When the U-phase switching timing is delayed by Tmove from a switching timing tv of the V-phase gate signal, a triangular-wave carrier cycle instruction (triangular-wave carrier instruction) TcarRef (=Tcar) of the U phase has a value calculated by equation 3.

$$TcarRef = Tcar = Tcar' + Tmove * \frac{100}{duty} * 2 \quad \text{(equation 3)}$$

Incidentally, in the case of making the cycle of the triangular-wave carrier shorter, the triangular-wave carrier cycle instruction TcarRef of the U phase may be set at a value calculated by equation 4. In either case, surge voltage superimposition can be avoided.

$$TcarRef = Tcar = Tcar' - Tmove * \frac{100}{duty} * 2 \quad \text{(equation 4)}$$

In addition, the calculation method of the variation amount of the triangular-wave carrier cycle does not need to be restricted to equation 3 or equation 4. It should suffice if a difference of the predetermined time Tmove or more is provided relative to the switching timing of the other phase.

The triangular-wave carrier generator 223 receives the triangular-wave carrier cycle instruction TcarRef which was calculated as described above, and calculates a triangular-wave carrier, for example, as described below.

For example, a value CarCnt of the triangular-wave carrier between time A and time B, during which the triangular-wave carrier of FIG. 4A is counted up, can be calculated by equation 5. At this time, Tcar' is a value of the triangular-wave carrier cycle before avoidance of superimposition.

$$CarCnt = \frac{100t}{Tcar'/2} \quad \text{(equation 5)}$$

In the above equation 5, if the cycle of the triangular-wave carrier is changed from Tcar' to Tcar(=TcarRef), the triangular-wave carrier can be calculated by equation 6.

$$CarCnt = \frac{100t}{Tcar'/2} = \frac{100t}{TcarRef/2} \quad \text{(equation 6)}$$

In this case, the value CarCnt of the triangular-wave carrier is a value of 0% or more and 100% or less. In equation 5 and equation 6, t is an elapsed time, with an operation point time A, at which count-down of the triangular-wave carrier is switched to count-up, being set as a reference (0 second).

In the case of varying the cycle of the triangular-wave carrier, a change of the calculation equation of the triangular-wave carrier from equation 5 to equation 6 is executed, for example, when the value CarCnt of the triangular-wave carrier is 0% (point A, C in FIG. 4).

The value CarCnt of the triangular-wave carrier between time B and time C, during which the triangular-wave carrier of FIG. 4A is counted down, can be calculated by equation 7. At this time, Tcar' is a value of the triangular-wave carrier cycle before avoidance of superimposition.

$$CarCnt = 100 - \frac{100t'}{Tcar'/2} \quad \text{(equation 7)}$$

In the above equation 7, if the cycle of the triangular-wave carrier was changed from Tcar' to Tcar(=TcarRef), the triangular-wave carrier can be calculated by equation 8.

$$CarCnt = 100 - \frac{100t'}{Tcar'/2} = 100 - \frac{100t'}{TcarRef/2} \quad \text{(equation 8)}$$

In this case, the value CarCnt of the triangular-wave carrier is a value of 0% or more and 100% or less. In equation 7 and equation 8, t' is an elapsed time, with an operation point time B, at which count-up of the triangular-wave carrier is switched to count-down, being set as a reference (0 second).

In the case of varying the cycle of the triangular-wave carrier, a change of the calculation equation of the triangular-wave carrier from equation 7 to equation 8 is executed, for example, when the value CarCnt of the triangular-wave carrier is 100% (point B in FIG. 4A).

The triangular-wave carrier generator 223 outputs the value CarCnt of the triangular-wave carrier, which was calculated as described above, to the switch opening/closing timing generator 224.

The switch opening/closing timing generator 224 compares the value CarCnt of the triangular-wave carrier and the PWM modulation instruction, and generates and outputs a switching opening/closing timing. For example, the switch opening/closing timing generator 224 always compares the received PWM modulation ratio instruction (U) of the U phase and the value of the triangular-wave carrier. When the PWM modulation ratio instruction (U) is greater than the triangular-wave carrier value, the switch opening/closing timing generator 224 outputs "1" (upper switch closing) as the switch opening/closing timing signal. When the PWM modulation ratio instruction (U) is less than the triangular-wave carrier value, the switch opening/closing timing generator 224 outputs "0" (upper switch opening) as the switch opening/closing timing signal. Incidentally, in this case, the switch driving circuit 30 generates, from the received switch opening/closing timing signal, gate signals SW2 and SW5 of the upper and lower switches Su and Sx such that the gate signals SW2 and SW5 have mutually inverted values, and outputs the gate signals SW2 and SW5.

Next, an explanation is given of the fact that the output voltage does not vary even in the case where the cycle of the triangular-wave carrier has been adjusted as described above.

Figure 6:
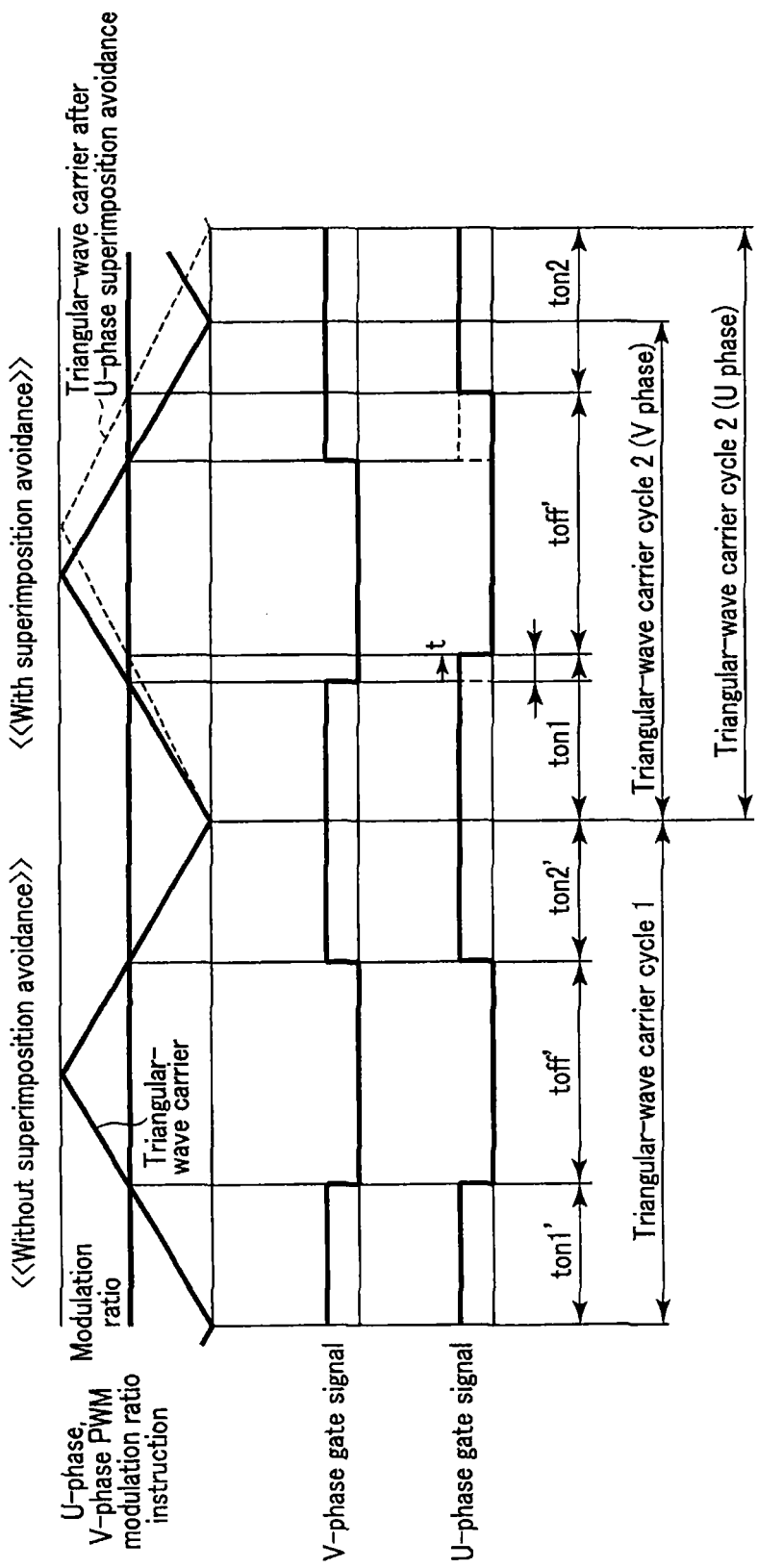
FIG. 6 is a timing chart of gate signals at a time when the switching timings of a U phase and V phase coincide in a three-phase inverter of the inverter controller, power converter and car illustrated in FIG. 1.

FIG. 6 is a timing chart of gate signals at a time when the switching timings of the U phase and V phase coincide in a three-phase inverter of the inverter controller, power converter and car illustrated in FIG. 1.

For example, as illustrated in FIG. 6, when the switching timings of the U phase and V phase have coincided in a case where surge voltage superimposition avoidance is not executed, a U-phase output voltage Vu of the three-phase inverter, which is determined from the U-phase gate signal in the case where surge voltage superimposition avoidance is not executed, and a DC link voltage value Vdc, can be calculated by equation 9. This voltage Vu is an average voltage of the U phase per cycle of the triangular-wave carrier.

$$Vu = \frac{Ton1' + Ton2'}{Ton1' + Ton2' + Toff} Vdc = \frac{\text{duty}}{100} Vdc \quad \text{(equation 9)}$$

In this case, ton1' and ton2' are periods in which the U-phase gate signal in a triangular-wave carrier cycle 1 is at high level, and toff is a period in which the U-phase gate signal in the triangular-wave carrier cycle 1 is at low level.

In addition, a U-phase output voltage Vu of the three-phase inverter, which is determined from the U-phase gate signal in the case where surge voltage superimposition avoidance in FIG. 6 was executed, and the DC link voltage value Vdc, can be calculated by equation 10. This voltage Vu is an average voltage of the U phase per cycle of the triangular-wave carrier.

$$Vu = \frac{Ton1 + Ton2}{Ton1 + Ton2 + Toff} Vdc = \frac{\text{duty}}{100} Vdc \quad \text{(equation 10)}$$

In this case, ton1 and ton2 are periods in which the U-phase gate signal in a triangular-wave carrier cycle 2 (U phase) is at high level, and toff is a period in which the U-phase gate signal in the triangular-wave carrier cycle 2 (U phase) is at low level.

As indicated by equation 9 and equation 10, the output voltage of the U phase is determined from the U-phase PWM modulation ratio instruction and the DC link voltage Vdc.

As has been described above, in the present embodiment, the output voltage of each phase can be kept constant, regardless of the presence/absence of the operation of the surge voltage superimposition avoidance. Specifically, in the three-phase voltage inverter, the voltage, which is applied to the load, such as the motor M, can be controlled, without being affected by the surge voltage superimposition avoidance operation.

FIG. 7 is a view for describing another example of the inverter controller, power converter and car of the embodiment.

The above-described embodiment is applicable to a configuration in which a combination of switches, which shares the DC link unit LINK and in which surge voltage superimposition occurs, is present, and is also applicable to, for example, a configuration including a booster BST, as illustrated in FIG. 7.

In this example, the power converter further includes a booster BST which boosts the voltage of the DC power supply BT and supplies the boosted voltage to the inverter INV, and a switching driving circuit 60. The inverter controller CTRL further includes a voltage controller 70.

The booster BST includes switches Sa and Sb, a coil L, and a capacitor C2. The switch Sa, Sb is, for example, a semiconductor switch, such as an FET (Field-Effect Transistor) or an IGBT (Insulated Gate Bipolar Transistor).

The switch Sa and switch Sb are connected in series, and are connected in parallel with the plural switches Su to Sz of the inverter INV. A series connection node between the switch Sa and switch Sb is electrically connected to the cathode of the DC power supply BT via the coil L. The capacitor C2 is connected in parallel with DC power supply BT and switch Sb.

The voltage controller 70 receives DC voltage information from the DC voltage detector 40 and a voltage instruction value from an external apparatus, and sets a PWM modulation ratio instruction value so that the DC voltage information and the voltage instruction value may agree. An external computer, which controls the inverter controller CTRL, may calculate the voltage instruction value.

The switch driving circuit 60 receives a switch opening/closing timing from a surge voltage superimposition avoiding unit (to be described later), and outputs gate signals to the booster BST so that the switches Sa and Sb of the booster BST may be opened/closed at this timing.

Figure 8:
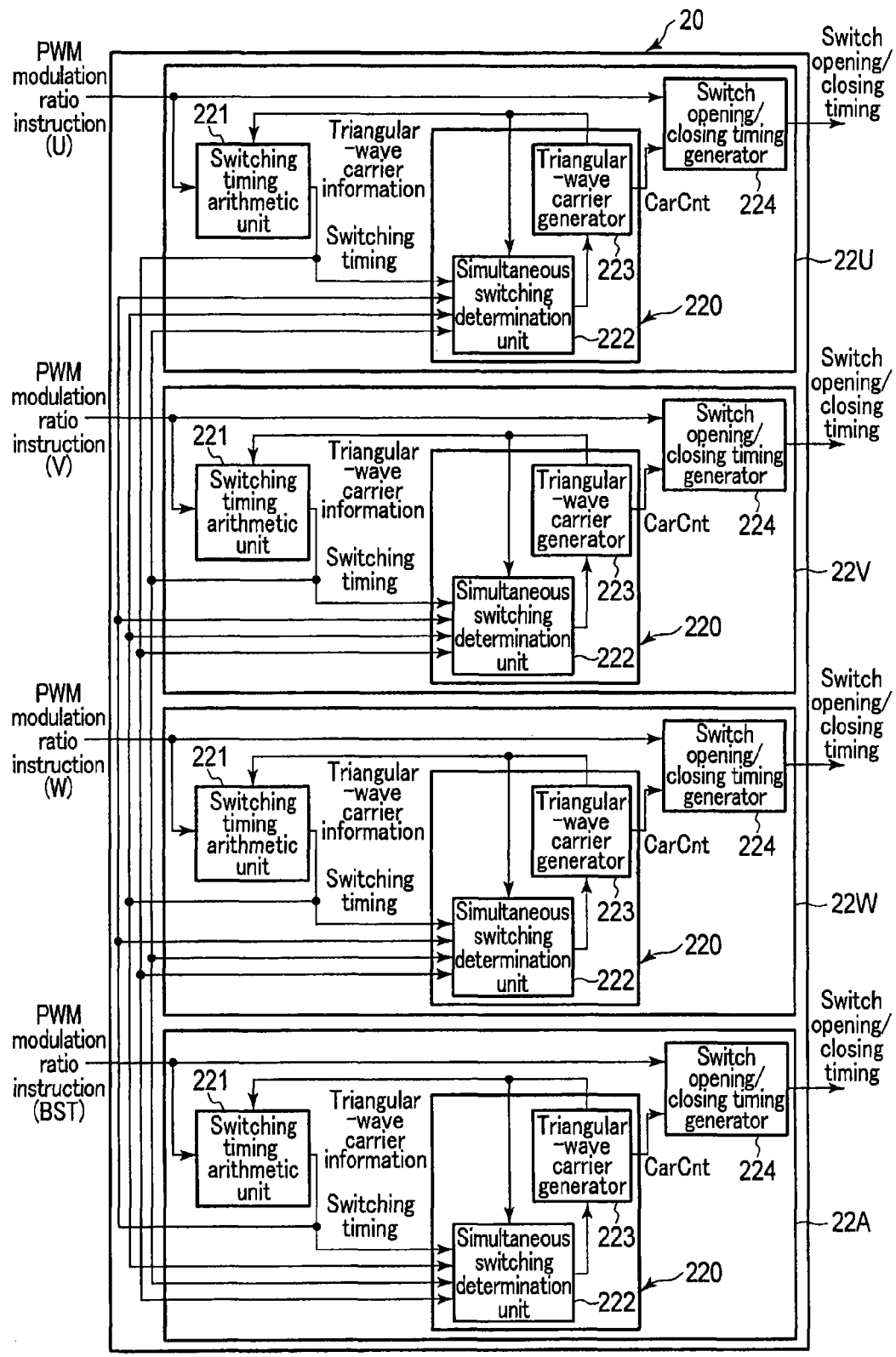
FIG. 8 is a block diagram illustrating a configuration example of a surge voltage superimposition avoiding unit of the inverter controller, power converter and car illustrated in FIG. 7.

FIG. 8 is a block diagram illustrating a configuration example of a surge voltage superimposition avoiding unit 20 of the inverter controller, power converter and car illustrated in FIG. 7.

The surge voltage superimposition avoiding unit 20 further includes a switch opening/closing signal generation circuit 22A which outputs a switch opening/closing timing of the booster BST. Since the configuration and operation of the switch opening/closing signal generation circuit 22A are the same as those of the above-described switch opening/closing signal generation circuits 22U, 22V and 22W, a description thereof is omitted here.

As described above, in the configuration in which the combination of switches, which shares the DC link unit LINK and in which surge voltage superimposition occurs, is present, the surge voltage superimposition avoiding unit for adjusting the opening/closing timing of the switches is provided. Thereby, superimposition of surge voltages can be avoided, and breakage of the switches by the application of a high voltage can be avoided. Similarly, the present embodiment is applicable to a configuration in which a plurality of boosters and a plurality of inverters are connected to a common DC link.

Incidentally, even in the case in which the booster BST is provided, a boosted voltage can be controlled without being affected by a superimposition avoidance operation.

Specifically, according to the present embodiment, it is possible to provide an inverter controller, a power converter, and a car, which can execute highly reliable inverter control at low cost.

Next, an inverter controller, a power converter and a car according to a second embodiment will be described with reference to the accompanying drawings. In the description below, the same structure as in the above-described embodiment is denoted by like reference numerals, and a description thereof is omitted.

FIG. 9 is a block diagram illustrating a configuration example of a switch opening/closing signal generation circuit in the inverter controller, power converter and car according to the second embodiment.

The inverter controller, power converter and car according to the second embodiment are different from those of the above-described embodiment with respect to the configuration of the switch opening/closing signal generation circuits 22U to 22W. Since the switch opening/closing signal generation circuits 22U, 22V and 22W of the respective phases have the same configuration, the configuration and operation of the switch opening/closing signal generation circuit 22U are described below, and a description of the switch opening/closing signal generation circuits 22V and 22W is omitted. In addition, in the description below, for the purpose of simple description, the triangular-wave carrier cycle is set at a fixed value.

The switch opening/closing signal generation circuit 22U includes a switching timing arithmetic unit 221, a simultaneous switching determination unit 222, a triangular-wave carrier generator 223 and a switch opening/closing timing generator 224.

In this embodiment, in the above-described configuration of the switch opening/closing signal generation circuit 22U, the operations of the simultaneous switching determination unit 222 and triangular-wave carrier generator 223 are different from those of the above-described embodiment.

FIG. 10 is a timing chart for describing an operation example of the surge voltage superimposition avoiding unit illustrated in FIG. 9.

In this example, an addition or a subtraction of the triangular-wave carrier value is stopped for a predetermined time at least at one of a timing when the triangular-wave carrier is 0% and a timing when the triangular-wave carrier is 100%.

The simultaneous switching determination unit 222 receives a switching timing tu' from the U phase from the switching timing arithmetic unit 221, and receives a V-phase switching timing tv' from the other phase. For example, if the absolute value of the difference between these timings is a predetermined time Tmove or more, the simultaneous switching determination unit 222 determines that no surge voltage is superimposed, and outputs a triangular-wave carrier stop time Tstop1 and a next-time triangular-wave carrier stop time Tstop2, which of which is set at 0 second.

The simultaneous switching determination unit 222 receives a U-phase switching timing tu' from the U phase from the switching timing arithmetic unit 221, and receives a V-phase switching timing tv' from the other phase, and if the absolute value of the difference between these timings is less than the predetermined time Tmove, the simultaneous switching determination unit 222 determines that a surge voltage is superimposed, and calculates a triangular-wave carrier stop time Tstop1 and a next-time triangular-wave carrier stop time Tstop2, and outputs them as triangular-wave carrier instructions.

The U-phase switching timing tu' for avoiding surge voltage superimposition needs to be delayed by the above-described Tmove from the V-phase switching timing tv'. Thus, the triangular-wave carrier stop time Tstop1, which is calculated by equation 11, is set.

$$Tstop1 = (tv' - tu') + Tmove \quad \text{(equation 11)}$$

In addition, the simultaneous switching determination unit 222 sets the next-time triangular-wave carrier stop time Tstop2. Like the above-described embodiment, this value is set so that the U-phase output voltage Vu becomes constant even in the case where surge voltage superimposition is avoided.

An ON time Ton in one cycle of the carrier of the U-phase gate signal can be expressed by equation 12, and an OFF time Toff can be expressed by equation 13.

$$Ton = \frac{duty}{100} Tcar + Tstop1 \quad \text{(equation 12)}$$

$$Toff = \frac{(100 - duty)}{100} Tcar + Tstop2 \quad \text{(equation 13)}$$

A U-phase average voltage Vu per triangular-wave carrier cycle at this time is given by equation 14.

$$Vu = \frac{Ton}{Ton + Toff} Vdc = \left(\frac{Tstop1}{Tstop2}\left(\frac{100}{duty} - 1\right)\right)\frac{duty}{100} Vdc \quad \text{(equation 14)}$$

The simultaneous switching determination unit 222 outputs the stop time Tstop2 so that equation 15 is established.

$$Tstop2 = Tstop1\left(\frac{100}{duty} - 1\right) \quad \text{(equation 15)}$$

By setting the stop time Tstop2, as indicated in equation 15, the inside in parentheses of the right side of equation 14 always becomes 1.

The triangular-wave carrier generator 223 receives the triangular-wave carrier stop time Tstop1 and the next-time triangular-wave carrier stop time Tstop2, and outputs a value of the triangular-wave carrier wave.

In the present embodiment, by setting the triangular-wave carrier stop time Tstop1 and the next-time triangular-wave carrier stop time Tstop2, as expressed in equation 11 and equation 15, the PWM modulation ratio of each phase can be kept constant, regardless of the presence/absence of the operation of surge voltage superimposition avoidance. This means that, in the three-phase voltage inverter, the voltage, which is applied to an inverter load such as a motor, can be controlled without being affected by the superimposition avoidance operation. In addition, even in the case where the booster is provided, the boost voltage can be controlled without being affected by the superimposition avoidance operation.

Incidentally, in the above description, the position at which the carrier is stopped is set at 0% and 100% of the triangular-wave carrier, but the same advantageous effects can be obtained when this position is set at an intermediate value such as 50%.

FIG. 11 is a graph illustrating an example of the ratio between the stop time Tstop2 and stop time Tstop1 in relation to a PWM modulation ratio instruction at a time when equation 15 is applied.

It is understood that when the PWM modulation ratio instruction is smaller, the stop time Tstop2 becomes greater in relation to the stop time Tstop1. If the stop time Tstop2 becomes greater, the time in which the U-phase switch is continuously opened/closed becomes longer, and thus the current control of the torque/current controller 10 fails to be established. In this case, the upper limit value may be provided for the stop time Tstop2, with priority being given to the establishment of the current control of the torque/current controller 10. In this case, although the stop time Tstop2 and U-phase output voltage Vu are not proportional to the PWM modulation ratio instruction, non-establishment of the current control can be avoided.

In addition, in this method, the next-time operation of the triangular-wave carrier is also determined. If the difference between the next-time U-phase switching timing and the next-time V-phase switching timing is less than the switching interval time Tmove in which a surge voltage is superimposed, the triangular-wave carrier may be stopped at time B' in FIG. 10 for the time Tstop2 calculated by equation 15, with priority being placed on keeping the U-phase output voltage Vu constant, or the triangular-wave carrier may be stopped at time B' in FIG. 10 for the time Tstop1 recalculated by equation 11, with priority being placed on avoidance of surge voltage superimposition. In either case, the same advantageous effects as in the above-described embodiment can be obtained.

Specifically, according to the present embodiment, it is possible to provide an inverter controller, a power converter, and a car, which can execute highly reliable inverter control at low cost.

Next, an inverter controller, a power converter and a car according to a third embodiment will be described with reference to the accompanying drawings.

In the case of varying the cycle of the triangular-wave carrier at a time of avoiding simultaneous switching, there are two methods, namely a method of making shorter the cycle of the triangular-wave carrier and a method of making longer the cycle of the triangular-wave carrier. Whichever method is selected, superimposition of a surge voltage can be prevented. Meanwhile, if the cycle of the triangular-wave carrier is made shorter, the precision of current control is enhanced, but the loss in switches increases. Conversely, if the cycle of the triangular-wave carrier is made longer, the loss in switches decreases, but the precision of current control deteriorates. Thus, there are merits and demerits in varying the cycle of the triangular-wave carrier. It is desirable that the cycle of the triangular-wave carrier be synchronous with the other phase, and it is also desirable to perform an operation with the basic cycle that is initially set.

FIG. 12 illustrates an example of a three-phase current at a time when triangular-wave carriers of the U phase and W phase of the three-phase inverter are set at 5000 Hz, and a triangular-wave carrier of the V phase is set at 4800 Hz.

For example, if the frequency of the triangular-wave carrier is varied from the other phase and surge voltage superimposition avoidance is executed, the timing of, for example, the U-phase output voltage deviates. By this deviation, for example, when the inductance component of the motor M, which is the three-phase inverter load, is small, there is a case in which the three-phase motor current oscillates. For example, the three-phase current oscillates at a component in the neighborhood of the carrier cycle.

When the current oscillates as described above, there was a case in which the energy conversion efficiency lowers. Thus, in the present embodiment, the surge voltage superimposition avoiding unit 20 executes adjustment such that the triangular-wave carrier frequency is synchronized with the other phase.

FIG. 13 is a block diagram illustrating a configuration example of a switch opening/closing signal generation circuit in the inverter controller, power converter and car according to the present embodiment.

The inverter controller, power converter and car according to the present embodiment are different from those of the above-described embodiment with respect to the configuration of the switch opening/closing signal generation circuits 22U to 22W. Since the switch opening/closing signal generation circuits 22U, 22V and 22W of the respective phases have the same configuration, the configuration and operation of the switch opening/closing signal generation circuit 22U are described below, and a description of the switch opening/closing signal generation circuits 22V and 22W is omitted.

The switch opening/closing signal generation circuit 22U includes a switching timing arithmetic unit 221, a simultaneous switching avoiding unit 220, and a switch opening/closing timing generator 224. The simultaneous switching avoiding unit 220 includes a simultaneous switching determination unit 222, a triangular-wave carrier synchronization unit 225, and a triangular-wave carrier generator 223. Specifically, in the present embodiment, the switch opening/closing signal generation circuit 22U further includes the triangular-wave carrier synchronization unit 225.

Figure 14:
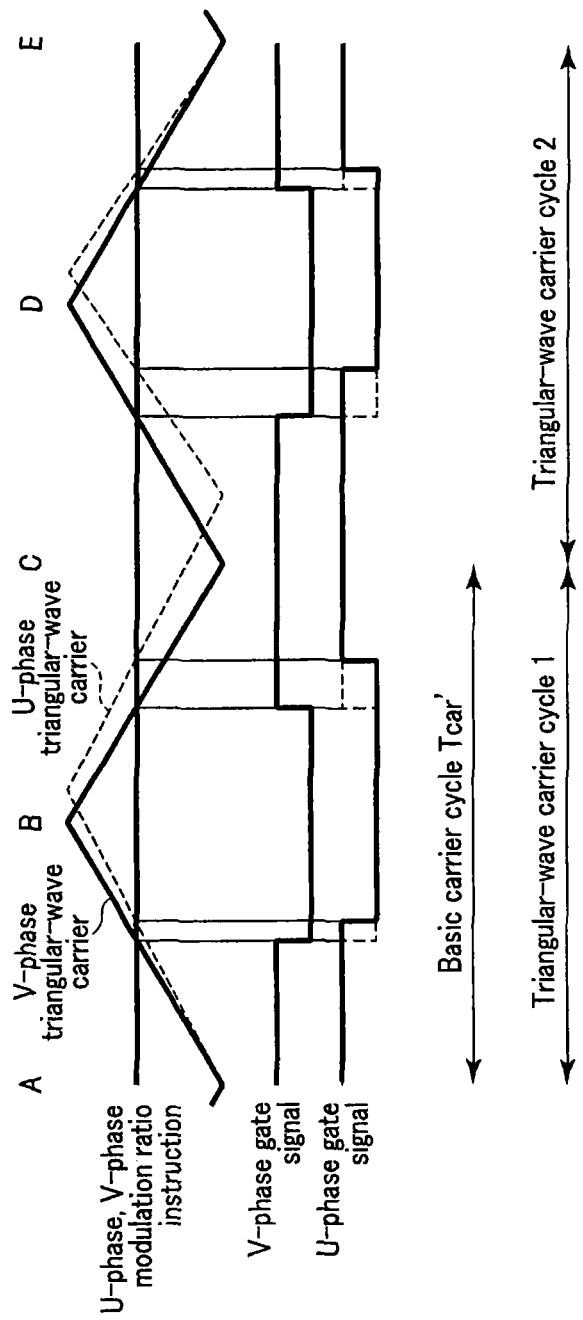
FIG. 14 is a timing chart for describing an operation example of a surge voltage superimposition avoiding unit illustrated in FIG. 13.

FIG. 14 is a timing chart for describing an operation example of a surge voltage superimposition avoiding unit illustrated in FIG. 13.

Incidentally, a description is given on the assumption that, in FIG. 14, the triangular-wave carrier cycle of the V-phase triangular-wave carrier is not varied in order to avoid surge voltage superimposition, and the V-phase triangular-wave carrier agrees with a basic wave carrier which is input to the triangular-wave carrier synchronization unit 225.

In the period of a triangular-wave carrier cycle 1, the U-phase gate signal is such a PWM modulation ratio instruction that simultaneous switching occurs with the V-phase gate signal. Thus, the U-phase triangular-wave carrier cycle is made longer by a degree corresponding to predetermined time Tch. Thereby, as described in the above first embodiment, surge voltage superimposition can be avoided without varying the average value of the U-phase output voltage.

At this time, in the period of a triangular-wave carrier cycle 2 in FIG. 14, the carrier cycle is set at (Tcar'−Tch). Thereby, at time E at which the triangular-wave carrier cycle 2 ends, both the U-phase triangular-wave carrier and the V-phase triangular-wave carrier become 0%. By adjusting the carrier cycle in this manner, the cycle of the U-phase triangular-wave carrier in the triangular-wave carrier cycle 2 onwards is made to agree with the cycle of the basic wave carrier. Thereby, an oscillation component of a current in the neighborhood of the triangular-wave carrier cycle of the current illustrated in FIG. 12 can be suppressed.

In the timing chart of FIG. 14, the U-phase carrier cycle is varied only in the period of the triangular-wave carrier cycle 1. However, in the case where the U-phase triangular-wave carrier cycle was set at (Tcar'−Tch) in the period of the cycle 2, as described above, if the simultaneous switching determination unit 222 determines that the difference between the switching timing of the U phase and the switching time of the other phase is small and surge voltage superimposition will occur, it is better for the triangular-wave carrier synchronization unit 225 to set a carrier cycle instruction TcarRef2 in accordance with the value of the carrier cycle instruction TcarRef, without synchronizing the U-phase triangular-wave carrier with the basic wave carrier.

When the simultaneous switching determination unit 222 does not determine simultaneous switching, the simultaneous switching determination unit 222 sets a value indicative of non-determination of simultaneous switching, such as a carrier cycle instruction 0. Upon receiving the value indicative of non-determination of simultaneous switching, the triangular-wave carrier synchronization unit 225 executes synchronization such that the waveform of the U-phase triangular-wave carrier and the waveform of the basic triangular carrier may coincide, and outputs the carrier cycle instruction TcarRef2.

According to the present embodiment, it is possible to provide an inverter controller, a power converter, and a car, which can execute highly reliable inverter control at low cost. Moreover, according to this embodiment, it is possible to avoid a large increase in switch loss and degradation in precision of current control, while avoiding superimposition of a surge voltage.

Next, an inverter controller, a power converter and a car according to a fourth embodiment will be described with reference to the accompanying drawings.

FIG. 15 is a block diagram illustrating a configuration example of a switch opening/closing signal generation circuit in the inverter controller, power converter and car according to the present embodiment.

In this embodiment, when the instruction value of the triangular-wave carrier cycle is calculated, either equation 3 or equation 4 is adopted, based on the sign of the value of current flowing in the phase for which the switch opening/closing timing is set.

Specifically, the simultaneous switching determination unit 222 receives, in addition to the switching timing of the U-phase and the switching timing of the other phase, a signal indicative of whether the triangular-wave carrier is being counted up or counted down, and information of the U-phase current value detected by a current sensor.

When the simultaneous switching determination unit 222 determines whether the switching timings of the U-phase and other phase coincide or not and calculates the triangular-wave carrier cycle instruction TcarRef, if the triangular-wave carrier is being counted up and the sign of the current value of the U phase is positive, or if the triangular-wave carrier is being counted down and the sign of the current value of the U phase is negative, the simultaneous switching determination unit 222 calculates the triangular-wave carrier cycle instruction TcarRef by using equation 4. Under conditions other than this, the simultaneous switching determination unit 222 calculates the triangular-wave carrier cycle instruction TcarRef by using equation 3.

By selecting the equation for calculating the cycle instruction TcarRef, as described above, it becomes possible to prevent an increase in absolute value of the U-phase current in a short period, when the U-phase triangular-wave carrier cycle was varied.

Figure 16:
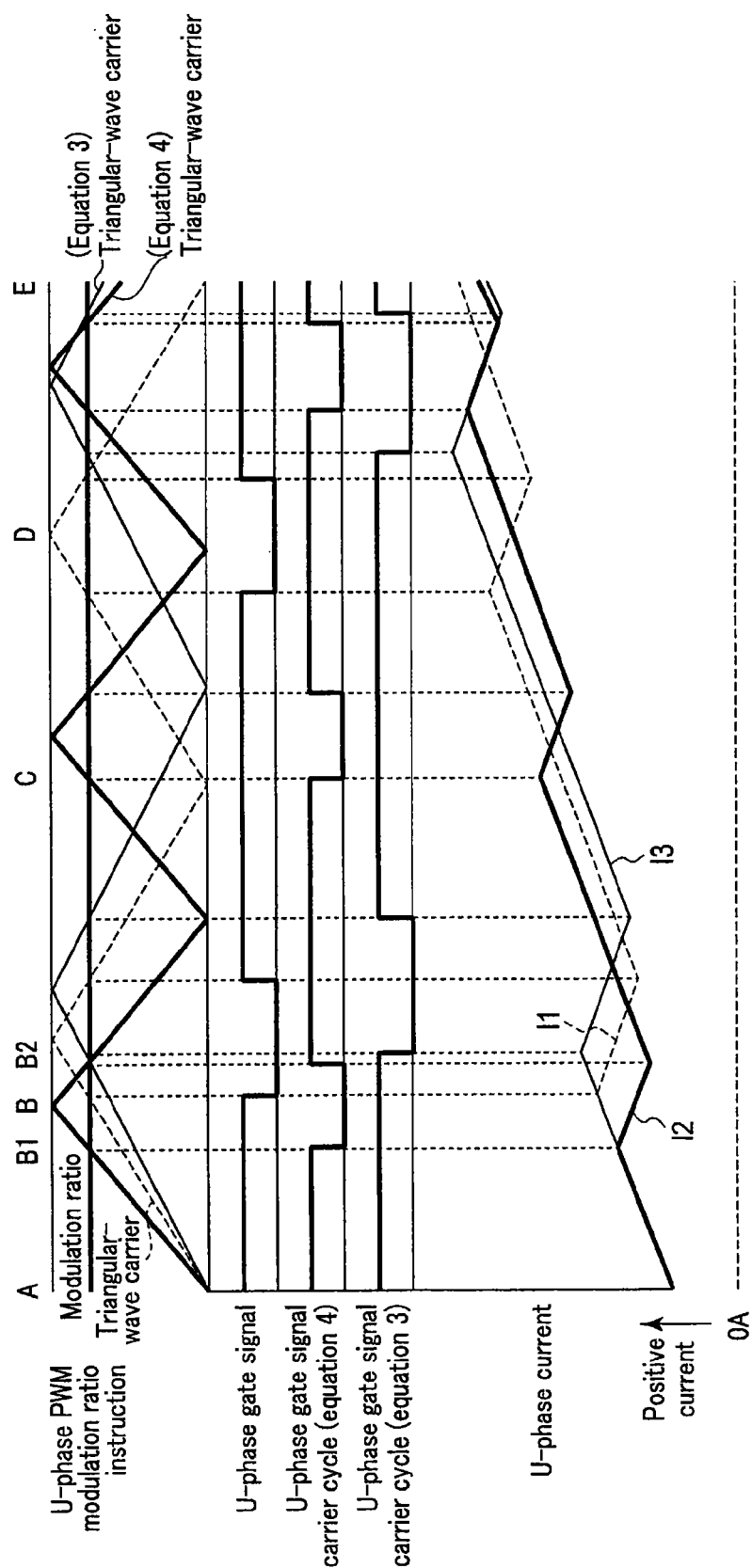
FIG. 16 is a view illustrating an example of a triangular-wave carrier with a varied triangular-wave carrier cycle, a gate signal, and a U-phase current, while the triangular-wave carrier is being counted up and when the sign of the U-phase current is positive.

FIG. 16 is a view illustrating an example of a triangular-wave carrier with a varied triangular-wave carrier cycle, a gate signal, and a U-phase current, while the triangular-wave carrier is being counted up and when the sign of the U-phase current is positive.

In FIG. 16, at time A, the triangular-wave carrier cycle is varied, for example, by the same method as in the first embodiment.

Compared to a U-phase current I1 in a case where the triangular-wave carrier cycle is not varied, the switching timing of a U-phase current I2 in a case of the triangular-wave carrier cycle calculated by equation 4 is time B1 and becomes earlier. Thereby, the gate signal is switched from ON to OFF, while the U-phase current is small. The switching timing of a U-phase current I3 in a case of the triangular-wave carrier cycle calculated by equation 3 is time B2 and becomes later. Thereby, as is understood, the U-phase current greatly increases.

In this manner, in the case where the triangular-wave carrier is being counted up and the sign of the U-phase current value is positive, the U-phase current in the neighborhood of a variation point of the U-phase switching timing can be made smaller by adopting equation 4. By suppressing the U-phase current to a small value, it is possible to prevent heat production by current of the switches Su to Sz of the three-phase inverter INV and the motor M.

Incidentally, as described in connection with the first embodiment, the average value of the U-phase output voltage is constant even if the triangular-wave carrier cycle is varied. Thus, as indicated by time E in FIG. 16, it is understood that, after the triangular-wave carrier cycle was varied, the U-phase current gradually converges to the same value, with the passage of time, regardless of the carrier cycle.

According to the present embodiment, it is possible to provide an inverter controller, a power converter, and a car, which can execute highly reliable inverter control at low cost.

Next, an inverter controller, a power converter and a car according to a fifth embodiment will be described with reference to the accompanying drawings.

The inverter controllers, power converters and cars according to the above-described first to fourth embodiments can be realized by creating only software of the inverter controller CTRL which generates gate signals of the switches Su to Sz, Sa and Sb. This is advantageous in that there is no additional cost due to added components. On the other hand, a part of the processing arithmetic operation time of a microcomputer, which is required for additional functions of the power converter, such as the control of the speed or torque of the load motor and the current, the execution of protection operation of the load motor or the power converter itself or the communication with other devices, is used for realizing the functions of the present embodiment.

Thus, in the case where the processor, which is mounted in the inverter controller CTRL of the power converter, has a high capability and the processing capability of the inverter controller CTRL has a sufficient allowance, the techniques described in the above first to fourth embodiments can be implemented with no problem. However, in a power converter using an inexpensive, low-capability processor, the processing capability of the inverter controller CTRL has no sufficient allowance, and, therefore, there is a case in which the implementation of the above-described first to fourth embodiment is difficult.

Taking the above into account, in the present embodiment, a description is given of an inverter controller, a power converter and a car, which can be implemented even in the case of a power converter device in which the processing capability of the inverter controller CTRL has no sufficient allowance.

Figure 17:
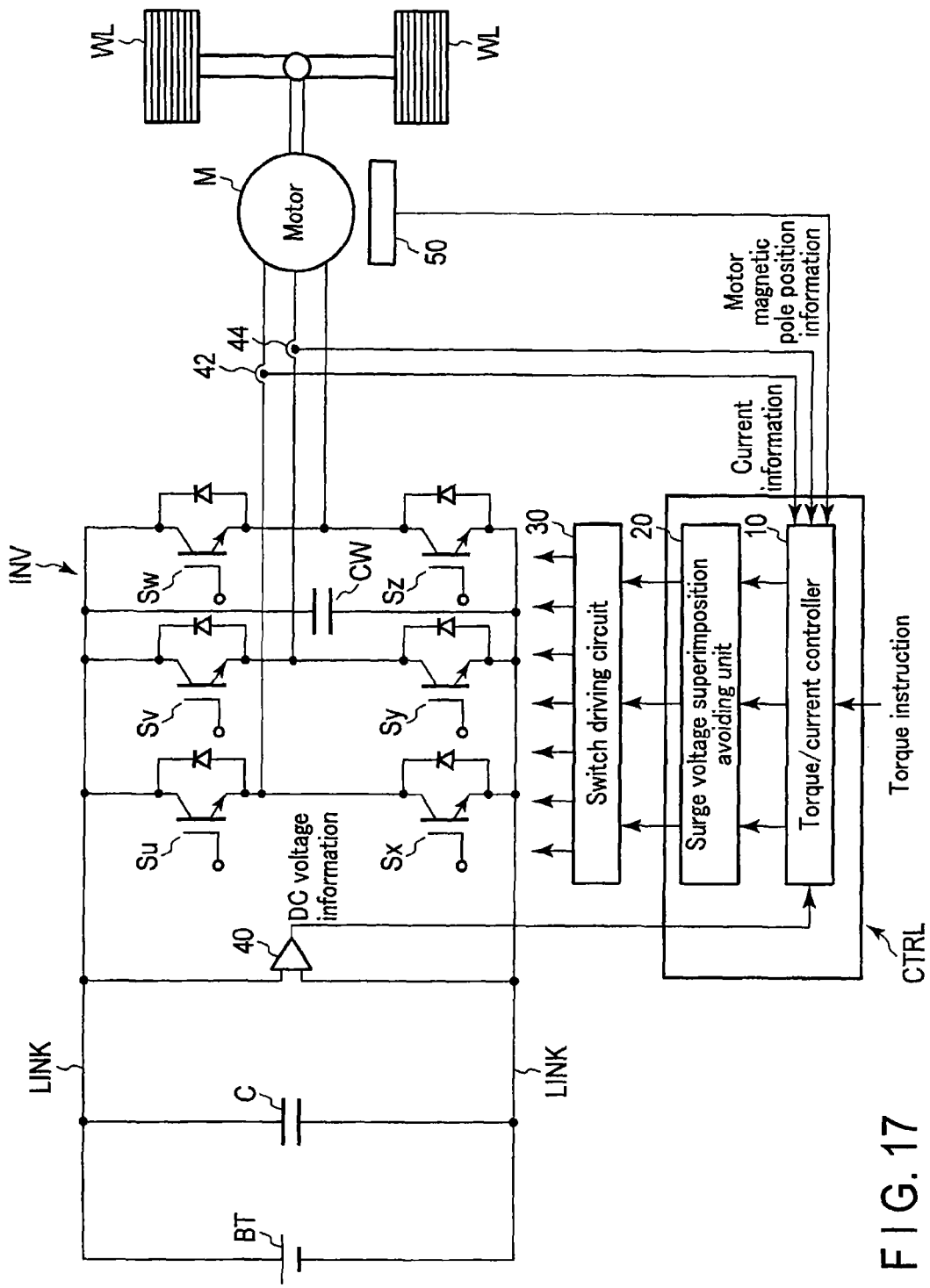
FIG. 17 is a view for describing an example of an inverter controller, a power converter and a car according to a fifth embodiment.

FIG. 17 is a view for describing an example of the inverter controller, power converter and car according to the present embodiment.

The inverter controller, power converter and car according to the present embodiment are configured to prevent breakage of switches Su to Sz due to a high surge voltage, namely a superimposed surge voltage, being applied to the switches Su to Sz. In the case of preventing the occurrence of a high surge voltage by combining the technique of the present embodiment and other techniques, the execution of superimposition avoidance by the technique of the present invention can be stopped, or the switches that are applied can be restricted.

For example, in the case where the power converter includes the inverter INV which drives a three-phase motor, a superimposition surge occurs by simultaneous switching of two of the switches Su to Sz in the respective phases of the U phase, V phase and W phase.

In this embodiment, a capacitor CW, which suppresses a surge voltage, is connected between the V phase and W phase of the inverter INV. In this case, no superimposition surge voltage occurs even when any one of the switches Su, Sx, Sv and Sy of the U phase and V phase and the switch Sw, Sz of the W phase are simultaneously switched. The reason for this is that a switching surge voltage of the W phase is absorbed by the capacitor CW, and is not applied to the switches Su, Sx, Sv and Sy of the U phase and V phase. For the same reason, a switching surge voltage of the switches Su, Sx, Sv and Sy of the U phase and V phase is not applied to the switch Sw, Sz of the W phase. Accordingly, even if the switching timing superimposition determination and avoidance are not applied to the switches Sw and Sz of the W phase, the occurrence of a superimposition surge can be prevented.

Incidentally, by making the above-described capacitor CW absorb a surge voltage of the U phase and V phase, the capacitor C may be omitted. Thereby, an increase in cost due to the addition of the capacitor CW can be suppressed.

FIG. 18 is a block diagram illustrating a configuration example of a surge voltage superimposition avoiding unit of the inverter controller, power converter and car illustrated in FIG. 17. The configuration of the surge voltage superimposition avoiding unit 20 of this embodiment differs from the configuration illustrated in FIG. 3 with respect to only the switch opening/closing signal generation circuit 22W.

The switch opening/closing signal generation circuit 22W includes a switch opening/closing timing generator 224 and a triangular-wave carrier generator 223 which outputs a basic triangular-wave carrier.

The switch opening/closing timing generator 224 generates a switch opening/closing timing by using the basic carrier wave, which is output from the triangular-wave carrier generator 223, and the PWM modulation ratio instruction (W).

As described above, in the present embodiment, the switching timing adjustment for superimposition avoidance is applied to only the switches Su, Sx, Sv and Sy of the U phase and V phase, and the processing amount of the inverter controller CTRL can be suppressed to be low.

Specifically, if superimposition avoidance of switching timing is executed for the three phases, namely the U phase, V phase and W phase, the determination and avoidance of switching timing superimposition have to be executed six times (3×2) in order to determine the switching of the three phases, since the objects of comparison of the switching timing of each phase are the other two phases. By contrast, in the present embodiment, in the case where there is no need to execute the determination and avoidance of switching timing superimposition of the W phase, the determination and avoidance of switching timing superimposition are executed for only the two phases, namely the U phase and V phase. In this case, since the object of comparison of the switching timing of each phase is the other one phase, the determination and avoidance of switching timing superimposition are executed two times (2×1) in order to determine the switching of the three phases. Therefore, compared to the case of executing superimposition avoidance for the three phases, the processing amount of the processor in the inverter controller, power converter and car of the present embodiment becomes only about ⅓.

The example, to which the present embodiment is applied, is not limited to the case in which the capacitor is connected in parallel with the switches between the switches Sw, Sz of the W phase, on the one hand, and the switches Su, Sx of the U phase and the switches Sv, Sy of the V phase in FIG. 1, on the other hand. For example, the same advantageous effects can be obtained even when the capacitor is connected in parallel with the switches Sa, Sb between the inverter INV and the booster BST in FIG. 7. Furthermore, the same advantageous effects can be obtained in methods other than the method in which the capacitor is inserted in parallel with the switches Su to Sz, Sa, and Sb. In the present embodiment, any one of the above-described first to fourth embodiments, or a combination of these, is applicable to the determination and avoidance of switching timing superimposition.

Next, a description is given of a configuration example, other than the example in which the capacitor is used, which are applicable to the inverter controller, power converter and car of the present embodiment.

In this example, the opening/closing speed of the switches, Su to Sz, of any one of the phases may be lowered. A surge voltage occurs by a quick change of a current flowing in the switches, Su to Sz, due to quick opening/closing of the switches, Su to Sz. Thus, the magnitude of a surge voltage can be decreased by gentle opening/closing, that is, slow switching between the open state and closed state of the switches Su to Sz.

For example, if the opening/closing time (the time that is needed for switching from the open state to the closed state or from the closed state to the open state) of the switches Sw, Sz of the W phase is made longer, a surge voltage of the W phase is small, even when the switches Su, Sx, Sw, Sz of the W phase and U phase are simultaneously switched, or the switches Sv, Sy, Sw, Sz of the W phase and V phase are simultaneously switched. Accordingly, a superimposition surge becomes smaller, and breakage of the switches Su to Sz can be prevented. Thereby, the occurrence of such a large superimposition surge as to break the switches Su to Sz can be prevented, even without executing the determination and avoidance of switching timing superimposition for the W-phase switches Sw and Sz.

The method of increasing the opening/closing time of the switches Su to Sz can be realized by delaying a time variation of gate signals, which the gate driving circuit that produces opening/closing signals of the switches Su to Sz supplies to the gate terminals of the switches Su to Sz. As the method of delaying the gate signal, for example, a method of increasing a gate resistance, which is present between the gate driving circuit and the switches Su to Sz, is applicable. This method utilizes the fact that the gate resistance and the time variation of the gate signal have a proportional relationship, since the semiconductor switches, such as FETs or IGBTs, which are the switches Su to Sz, have electrostatic capacitance (capacitor) characteristics. For example, the gate resistance may be increased by inserting a resistor at a front stage of the output terminal of the gate driving circuit, or may be increased by inserting a resistor between the output terminal of the gate driving circuit and the gate terminal of the switch, Su to Sz.

In addition, the opening/closing time of the switches, Su to Sz, may be increased in a phase other than the W phase. It should suffice if the opening/closing time of the switches, Su to Sz, is increased in at least one phase. In this example, too, any one of the above-described first to fourth embodiments, or a combination of these, is applicable to the determination and avoidance of switching timing superimposition.

In the above case, too, the determination and avoidance of switching timing superimposition are applied to only the switches Su, Sx, Sv and Sy of the U phase and V phase, and the inverter controller CTRL may execute arithmetic operations relating to only the U phase and V phase. Therefore, according to the above-described inverter controller, power converter and car, the same advantageous effects as in the above-described embodiments can be obtained with a small arithmetic process amount.

However, since the opening/closing time of the switches of any one of the phases is made slower, a switching loss in the power converter increases. Thus, the opening/closing time of the switches, Su to Sz, should be adjusted to become a proper time, in accordance with a surplus of the processing capability of the processor and the environment of use, such as a loss or heat production which can be tolerated by the power converter.

For example, in the case where the power converter illustrated in FIG. 1 includes a heat sink to which a coolant, such as water or air, is supplied, and the switches Su to Sz are cooled by this heat sink, the cooling capabilities of the switches Su to Sz are different due to the path through which the coolant passes. The reason for this is that, compared to the temperature at which the coolant is supplied to the power converter, the temperature of the coolant, which is discharged from the power converter rises by a degree corresponding to the absorption of heat produced by the switches Su to Sz. Hence, the temperature of the switch, which is disposed at a location near the supply port of the coolant is always lower than the temperature of the switch disposed at a location near the outlet port of the coolant. Accordingly, by slowing the opening/closing time of the switch which is disposed at a location near the supply port of the coolant, breakage of this switch due to an excessive superimposition surge voltage is prevented. Thereby, even if the heat production of this switch increases, the cooling capability of this switch is higher than the other switches, and therefore a decrease in output of the power converter can be avoided.

By taking the environment of use of the power converter into account, as described above, it becomes possible to realize all of the maintenance of operation capability of the power converter, the prevention of an excessive superimposition surge voltage, and the reduction in CPU processing amount.

In the above-described example, the same determination and avoidance of switching timing superimposition as in the above-described embodiments are not executed in a certain phase of the inverter INV. Thereby, the processing amount of the processor of the inverter controller CTRL is reduced. However, the opening/closing time of the switch in a certain phase may be increased only in either turn-on or turn-off. In this case, although surge voltages occur in both turn-on and turn-off of the switch, Su to Sz, the opening/closing time can be independently varied in turn-on and turn-off. By increasing the opening/closing time in either turn-on or turn-off, it becomes possible to prevent the occurrence of an excessive superimposition surge voltage at the time of switching. By utilizing this, the processing amount of the processor of the inverter controller CTRL can be reduced in the same manner as in the above-described example.

For example, when superimposition avoidance is executed both at the turn-on switching timing and the turn-off switching timing with respect to the switches Su to Sz of all the three phases, the objects of switching, which are compared with the switching timing of each phase, are the other two phases, and the superimposition avoidance is executed two times, i.e. at turn-on and turn-off, with respect to each of the switches Su to Sz. Thus, the determination and avoidance of superimposition are executed 12 times (3×2×2) in order to determine the switching timings for the three phases.

By contrast, when the superimposition avoidance is executed either at the turn-on switching timing or at the turn-off switching timing, the superimposition avoidance of the switching timing is not executed with respect to either turn-on or turn-off of the switches Su to Sz. Thus, the determination and avoidance of superimposition are executed 6 times (3×2×1).

Accordingly, compared to the case of executing superimposition avoidance both at the turn-on switching timing and the turn-off switching timing with respect to the switches Su to Sz of all the three phases, in the case of executing the superimposition avoidance either at the turn-on switching timing or at the turn-off switching timing, the processing amount of the processor of the inverter controller CTRL in the inverter controller, power converter and car becomes about ½.

Specifically, according to the present embodiment, like the above-described plural embodiments, it is possible to provide an inverter controller, a power converter, and a car, which can execute highly reliable inverter control at low cost.

Next, an inverter controller, a power converter and a car according to a sixth embodiment will be described with reference to the accompanying drawings.

Like the above-described fifth embodiment, the inverter controller, power converter and car of the present embodiment are configured to prevent the occurrence of an excessive superimposition surge voltage, while reducing the processing amount of the processor of the inverter controller. The inverter controller, power converter and car of the present embodiment are configured to realize superimposition avoidance of switching timing by a structure other than the processor, thereby preventing the occurrence of an excessive superimposition surge voltage, without increasing the processing amount of the processor which controls the inverter controller.

FIG. 19 is a view for describing an example of the inverter controller, power converter and car according to this embodiment.

In the power converter of this embodiment, a high-function logic circuit 80, such as an FPGA (field-programmable gate array) or a CPLD (complex programmable logic device), and a temperature sensor SS for sensing temperatures of switches Su to Sz, are provided between the switch driving circuit 30 and the inverter INV. Gate signals are applied to the gates of the switches Su to Sz via the logic circuit 80.

The logic circuit 80 includes a function of receiving gate signals and providing such a dead time that the upper-stage and lower-stage switches of the inverter INV are set in the closed state at the same time, thereby preventing the power supply from entering a short-circuit connection state, and a function of monitoring the current of the switches (detection values of the current detectors 42, 44) and the temperature state (detection values of the temperature sensor SS) and stopping the supply of gate signals to the gate terminals of the switches Su to Sz, thereby preventing the switches Su to Sz from being broken by overheat or overcurrent. As described above, the logic circuit 80 processes the gate signals so as to prevent simultaneous switching with other switches, and thereby the occurrence of an excessive superimposition surge voltage can be prevented.

For example, as regards the switches Sa, Sb of the phase which does not share the logic circuit 80, such as the switch driving circuit 60 of the booster BST shown in FIG. 19, it is not possible to avoid simultaneous switching by the logic circuit 80 alone. It is thus necessary to determine, by the processor of the inverter controller CTRL, the occurrence of an excessive superimposition surge voltage due to simultaneous switching between the gate signal of the inverter INV and the gate signal of the booster BST.

Figure 20:
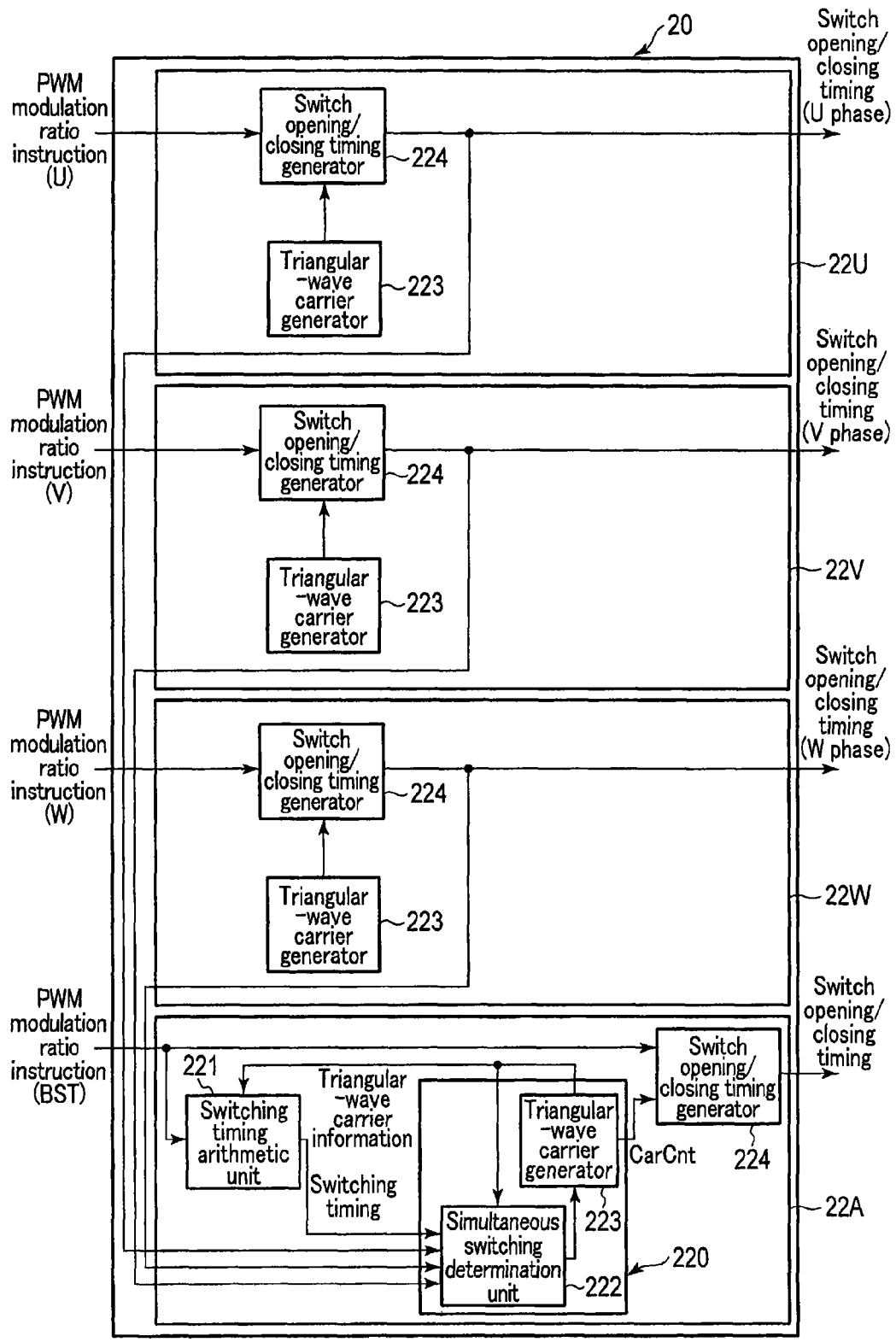
FIG. 20 is a block diagram illustrating a configuration example of a surge voltage superimposition avoiding unit of the inverter controller, power converter and car illustrated in FIG. 19.

FIG. 20 is a block diagram illustrating a configuration example of a surge voltage superimposition avoiding unit of the inverter controller, power converter and car illustrated in FIG. 19.

Each of the switch opening/closing signal generation circuits 22U, 22V and 22W includes a switch opening/closing timing generator 224 and a triangular-wave carrier generator 223 which outputs a basic triangular-wave carrier. In FIG. 20, each of the switch opening/closing signal generation circuits 22U, 22V and 22W includes the triangular-wave carrier generator 223, but the switch opening/closing signal generation circuits 22U, 22V and 22W may share a single triangular-wave carrier generator 223.

The switch opening/closing timing generator 224 outputs a switching opening/closing timing to the gate driving circuit 30 by using the basic triangular-wave carrier, which is output from the triangular-wave carrier generator 223, and the PWM modulation ratio instruction.

Like the above-described first to fourth embodiments, the switch opening/closing signal generation circuit 22A adjusts the switching timing of the semiconductor switch Sa, Sb, so as to avoid superimposition of switching timings of the U phase, V phase and W phase of the inverter INV. In the present embodiment, any one of the above-described first to fourth embodiments, or a combination of these, is applicable to the determination and avoidance of switching timing superimposition.

In the above configuration, the inverter controller CTRL does not need to monitor the simultaneous switching between the three phases in the inverter INV. When the gate signals of the inverter INV are processed, it should suffice if the inverter controller CTRL monitors whether an excessive superimposition surge voltage occurs due to simultaneous switching with the gate signals of the booster BST. Accordingly, the processing amount of the processor of the inverter controller CTRL can be reduced by such an amount that there is no need to monitor the simultaneous switching between the three phases in the inverter INV.

In addition, in the case where the logic circuit 80 executes the processing of the triangular-wave carrier for generating gate signals, even if the processing amount of the processor is reduced by executing the switching timing superimposition determination/avoidance on the logic circuit 80, the occurrence of an excessive superimposition surge can be prevented.

Specifically, according to the present embodiment, like the above-described plural embodiments, it is possible to provide an inverter controller, a power converter, and a car, which can execute highly reliable inverter control at low cost.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The various components shown in the inverter controller CTRL, the switching driving circuit 30 and the logic circuit 80 may be implemented in hardware, software, or a combination of both hardware and software. The inverter controller CTRL may include one or more signal processing and/or application specific integrated circuits.

For example, the above-described first embodiment and second embodiment may be combined. By this combination, it becomes necessary to consider the triangular-wave carrier cycle instruction of equation 3 and equation 4, the triangular-wave stop time of equation 11, and the next-time triangular-wave carrier stop time of equation 15. However, for example, when the U-phase triangular-wave carrier is stopped by the method of the second embodiment, the U-phase triangular-wave carrier of the next and following times becomes a triangular-wave carrier which delays from the other triangular-wave carrier by (Tstop1+Tstop2). By calculating the triangular-wave carrier cycle instruction TcarRef which is obtained by substituting (Tstop1+Tstop2) for Tmove in equation 4, the U-phase triangular-wave carrier can be synchronized with the other-phase triangular-wave carrier.

In this manner, by combining the first embodiment and the second embodiment, it becomes possible to execute synchronization with the other phase, as described above, or to freely set the switching timing for avoiding surge voltage superimposition.

Besides, when the U-phase switching timing is shifted from the V-phase switching timing by the predetermined time Tmove, there are two methods. One is a method in which the U-phase triangular-wave carrier cycle is increased so that the U-phase switching timing delays from the V-phase switching timing by the predetermined time Tmove. The other is a method in which the U-phase triangular-wave carrier cycle is increased so that the U-phase switching timing becomes earlier than the V-phase switching timing by the predetermined time Tmove.

In order to determine which of the above two methods is to be selected, the simultaneous switching determination unit 222 may store the basic triangular-wave carrier cycle Tcar'. For example, the switching timing arithmetic unit 221 receives the PWM modulation ratio instruction of the U phase and a previously determined triangular-wave carrier cycle Tcar−1 from the triangular-wave carrier generator 223, and calculates the switching timing of the U phase.

The simultaneous switching determination unit 222 compares this calculated switching timing with the other-phase switching timing, and determines whether or not to vary the triangular-wave cycle. If the time difference between the U-phase switching timing and the other-phase switching timing is sufficiently large, the triangular-wave carrier cycle instruction TcarRef may remain the same as the previous value Tcar−1.

If the simultaneous switching determination unit 222 determines that the time difference between the U-phase switching timing and the other-phase switching timing is small and surge voltage superimposition will occur, the simultaneous switching determination unit 222 calculates the triangular-wave carrier cycle instruction TcarRef by equation 3 and equation 4.

The simultaneous switching determination unit 222 selects, for example, either the triangular-wave carrier cycle instruction TcarRef calculated by equation 3 or the triangular-wave carrier cycle instruction TcarRef calculated by equation 4, which is closer to the value of the prestored basic triangular-wave carrier cycle Tcar', and outputs the selected triangular-wave carrier cycle instruction TcarRef to the triangular-wave carrier generator 223.

Thereby, it is possible to prevent the following problem. That is, the cycle of the triangular-wave carrier, which is generated by the triangular-wave carrier generator 223, becomes greatly different from the basic wave carrier cycle, and the current control of the torque/current controller 10 or the voltage control of the voltage controller 70 enters a control failure state due to the switching delay of gate signals.

In addition, it is possible to prevent the following problem. That is, if the cycle of the triangular-wave carrier becomes shorter than the basic triangular-wave carrier cycle Tcar', the switching loss, which occurs in the three-phase inverter INV or in the switches Sa, Sb of the booster BST, increases, and the motor output is limited by, for example, degradation in energy conversion coefficient, or a temperature rise of the switch due to heat production.

The invention claimed is:

1. An inverter controller comprising:
a current controller configured to calculate and output PWM modulation ratio instructions of a plurality of phases including a first phase and a second phase, such that an inverter outputs a predetermined current, based on an instruction supplied from an outside;
a switching timing arithmetic unit configured to calculate timings at which switches of the respective phases are opened and closed, based on the PWM modulation ratio instructions;
a simultaneous switching avoiding unit configured to determine whether a first switching timing for changing over the switch of the first phase and a second switching timing for changing over the switch of the second phase coincide or not, and to generate, upon determining that the first switching timing and the second switching timing coincide, triangular-wave carriers of the first phase and the second phase by making different waveforms of the triangular-wave carriers; and
a switch opening/closing timing generator configured to calculate a timing for opening/closing the switch of each of the phases, based on the triangular-wave carrier and the PWM modulation ratio instruction.

2. The inverter controller of claim 1, wherein the simultaneous switching avoiding unit is configured to vary a cycle of the triangular-wave carrier of the first phase, when the simultaneous switching avoiding unit determines that the first switching timing and the second switching timing coincide.

3. The inverter controller of claim 1, wherein the simultaneous switching avoiding unit is configured to generate and output the triangular-wave carriers so as to stop increase or decrease of a value of the triangular-wave carrier of the first phase for a predetermined time, when the simultaneous switching avoiding unit determines that the first switching timing and the second switching timing coincide.

4. The inverter controller of claim 1, wherein the simultaneous switching avoiding unit is configured to determine that the first switching timing and the second switching timing coincide, when a time difference between the first switching timing and the second switching timing is less than a predetermined time, and to make different the waveforms of the triangular-wave carriers of the first phase and the second phase such that the time difference between the first switching timing and the second switching timing becomes the predetermined time or more.

5. The inverter controller of claim 1, wherein the simultaneous switching avoiding unit is configured to receive a basic triangular-wave carrier which agrees with an initial value of each of the triangular-wave carriers of the plurality of phases, and to make the waveforms of the triangular-wave carriers of the first phase and the second phase agree with the basic triangular-wave carrier, after generating the triangular-wave carriers of the first phase and the second phase by making different the waveforms of the triangular-wave carriers of the first phase and the second phase.

6. The inverter controller of claim 2, wherein the simultaneous switching avoiding unit is configured to calculate an amount by which triangular-wave carrier cycles of the first phase and the second phase are made different, based on a sign of an output current value of the first phase.

7. A power converter comprising:
an inverter including a plurality of phases each including a pair of switches connected to a DC current supply line; and
the inverter controller of claim 1, which controls timings at which the switches are changed over.

8. The power converter of claim 7, wherein at least one of the plurality of phases includes a capacitor connected in parallel with the pair of switches. and
the first phase and the second phase are different from the phase including the capacitor.

9. The power converter of claim 7, further comprising a booster including a second pair of switches which are connected in parallel with the pair of switches of the inverter,
wherein the switches of the first phase are the switches of the booster, and the second phase is any one of the plurality of phases of the inverter.

10. An electric motor car comprising:
converter of claim 7;
a motor configured to operate by AC power supplied from the inverter;
a DC power supply configured to supply DC power to the inverter, and to be charged with electric energy which is generated by the motor via the inverter; and
an axle configured to be driven by a driving force of the motor.

* * * * *